US005596702A

United States Patent [19]
Stucka et al.

[11] Patent Number: 5,596,702
[45] Date of Patent: Jan. 21, 1997

[54] METHOD AND SYSTEM FOR DYNAMICALLY SHARING USER INTERFACE DISPLAYS AMONG A PLURALITY OF APPLICATION PROGRAM

[75] Inventors: Joan E. Stucka; Richard Wiss, both of Boulder, Colo.

[73] Assignee: International Business Machines Corporation, Armonk, N.Y.

[21] Appl. No.: 49,697

[22] Filed: Apr. 16, 1993

[51] Int. Cl.$^6$ .................................................. G06F 15/00
[52] U.S. Cl. ........................ 395/340; 395/356; 395/326
[58] Field of Search ................................. 395/155, 156, 395/157, 158, 159, 160, 161, 162, 700

[56] References Cited

U.S. PATENT DOCUMENTS

| | | | |
|---|---|---|---|
| 4,692,958 | 9/1987 | Redford et al. | 364/200 |
| 4,866,638 | 9/1989 | Cosentino et al. | 364/521 |
| 4,870,561 | 9/1989 | Love et al. | 364/192 |
| 5,062,060 | 10/1991 | Kolnick | 364/521 |
| 5,072,412 | 12/1991 | Henderson et al. | 395/159 |
| 5,226,163 | 7/1993 | Karsh et al. | 395/700 |
| 5,241,624 | 8/1993 | Torres | 395/155 |
| 5,241,663 | 9/1993 | Busboom et al. | 395/155 |
| 5,263,167 | 11/1993 | Conner, Jr. et al. | 395/700 |
| 5,287,514 | 2/1994 | Gram | 395/700 |
| 5,297,248 | 3/1994 | Clark | 395/155 |
| 5,297,286 | 3/1994 | Uehara | 395/700 |
| 5,327,529 | 7/1994 | Fults et al. | 395/155 |
| 5,335,320 | 8/1994 | Iwata et al. | 395/155 |
| 5,345,550 | 9/1994 | Bloomfield | 395/156 |

FOREIGN PATENT DOCUMENTS 0451963  10/1991  European Pat. Off. .......... G06F 9/44

OTHER PUBLICATIONS

Computer Graphics Principles and Practice, 2nd Edition, Foley, et al., ISBN 0–201–12110–7.
Composing User Interfaces With Interviews, Linton, et al., IEEE Computer, Feb. 1989.
IBM Technical Disclosure Bulletin, Shared Object Server for Multi–User Computer Workstations, vol. 31, No. 1, Jun. 1988.
IBM Technical Disclosure Bulletin, Architecture for Separate User–Interface Software Development, vol. 33, No. 6A, Nov. 1990.

*Primary Examiner*—Mark R. Powell
*Assistant Examiner*—Huynh Ba
*Attorney, Agent, or Firm*—Edward H. Duffield

[57] ABSTRACT

There is provided a system and method for the dynamic sharing of user interfaces and portions of user interfaces. A user interface server coupled to applications, a display object store, and a window management system. The user interface server allows an application developer to provide an application with a user interface that is independent of any particular window management system. The user interface server provides applications with the ability to dynamically load user interfaces from the display object store and to attach any sub-hierarchy of a user interface, stored in the display object store, to a previously loaded user interface. The sub-hierarchy can be attached at any point which is consistent with parent-child relationships for components.

6 Claims, 20 Drawing Sheets

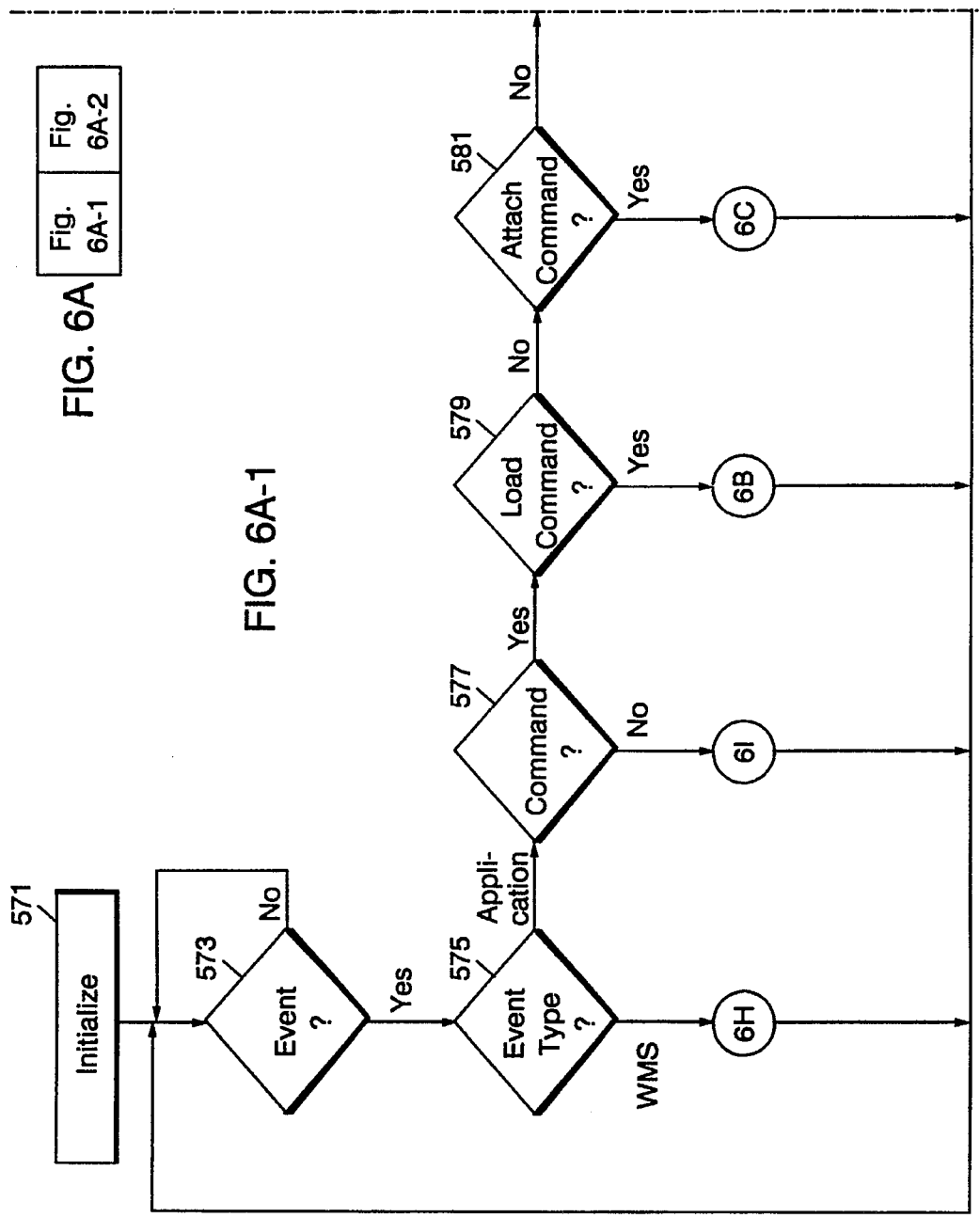

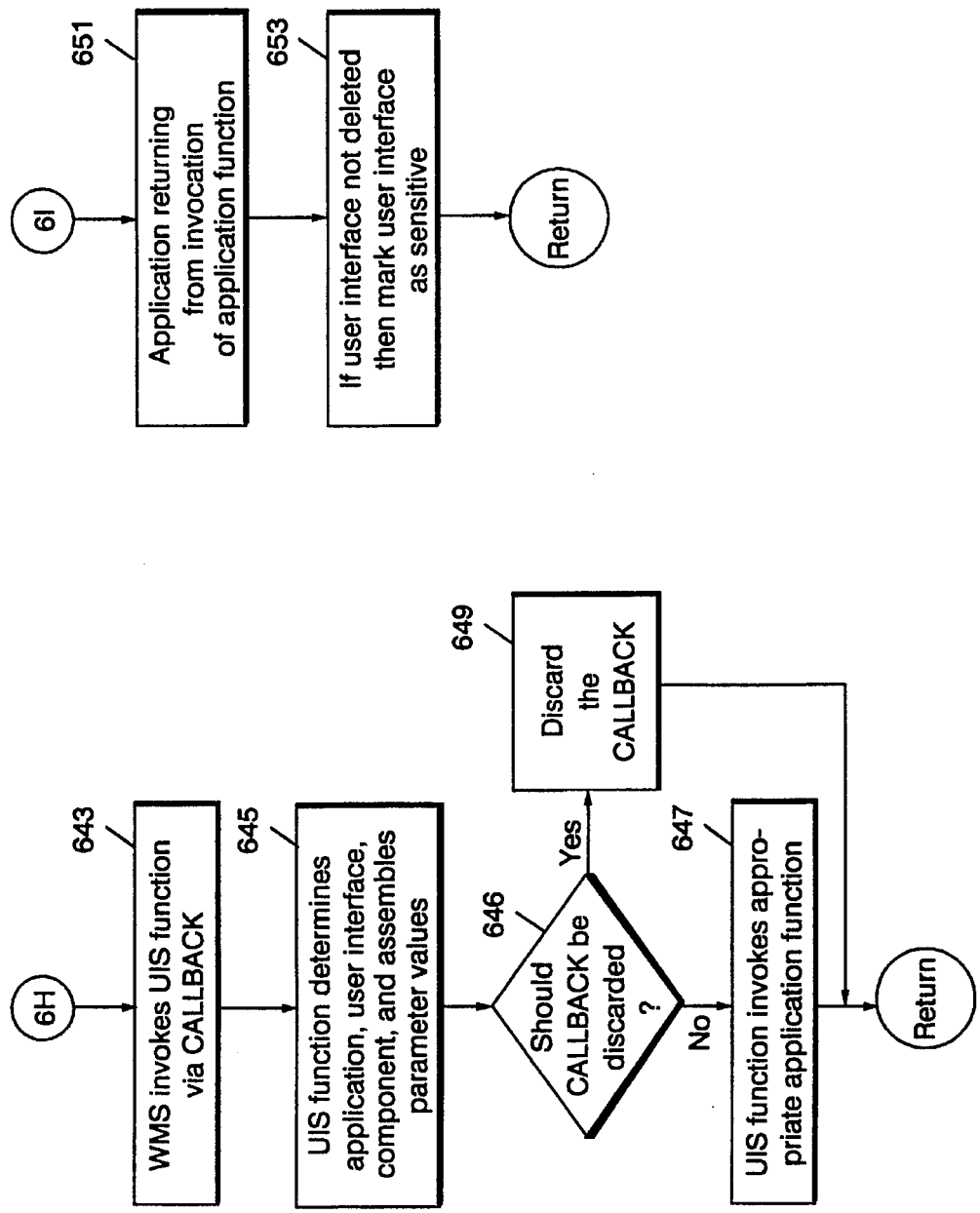

FIG. 8B

Interface-1 as stored in DOS
DISPLAY
COMPONENT "IEPrimaryWindow" " " 0 1
    name = "IEPrimaryWindow"
    unit_type = "Characters"
    height = "300"
    width = "400"
    minimum_height = "141"
    minimum_width = "213"
    title = "INTERFACE-1"
    icon_label = " "
COMPONENT "main_menu" "IEPrimaryWindow" 3 1
    name = "main_menu"
    menu_accelerator = "<Key>F10"
    margin_width = "5"
    margin height = "3"
COMPONENT "file_button" "main_menu" 9 1
    name = "file_button"
    label_string = "File"
    mnemonic = "F"
    activate_button_Callback = "do_file_Pulldown"
    order = "1"
COMPONENT "edit_button" "main_menu" 9 1
    name = "edit_button"
    label_string = "Edit"
    mnemonic = "E"
    order = "2"
COMPONENT "view_button" "main_menu" 9 1
    name = "view_button"
    label_string = "View"
    mnemonic = "V"
    order = "3"
COMPONENT "option_button" "main_menu" 9 1
    name = "option_button"
    label_string = "Options"
    mnemonic = "O"
    order = "4"

Interface-2 as stored in DOS
DISPLAY
COMPONENT "IEPrimaryWindow" " " 0 1
    name = "IEPrimaryWindow"
    unit_type = "Characters"
    height = "300"
    width = "400"
COMPONENT "main_menu" "IEPrimaryWindow" 3 1
    name = "main_menu"
COMPONENT "file_button" "main_menu" 9 1
    name = "file_button"
    label_string = "File"
    activate_button_Callback = "gen_file_Pulldown"
COMPONENT "file_pulldown" "file_button" 6 1
    name = "file_pulldown"
COMPONENT "new_button" "file_pulldown" 9 1
    name = "new_button"
    label_string = "New"
    mnemonic = "N"
    order = "1"
COMPONENT "open_button" "file_pulldown" 9 1
    name = "open_button"
    label_string = "Open"
    mnemonic = "O"
    order = "2"
COMPONENT "saveas_button" "file_pulldown" 9 1
    name = "saveas_button"
    label_string = "Save as"
    mnemonic = "S"
    order = "3"
COMPONENT "print_button" "file_pulldown" 9 1
    name = "print_button"
    label_string = "Print"
    mnemonic = "P"
    order = "4"
COMPONENT "quit_button" "file_pulldown" 9 1
    name = "quit_button"
    label_string = "Quit"
    mnemonic = "Q"
    order = "5"

FIG. 9B

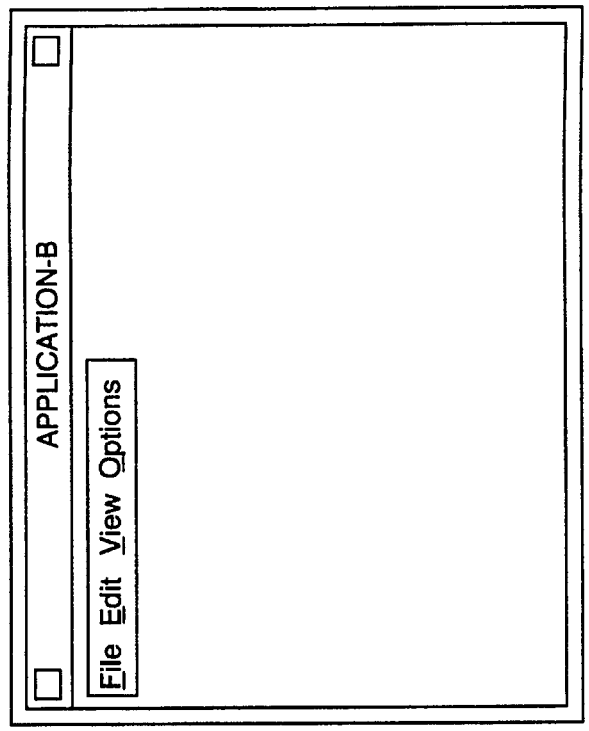
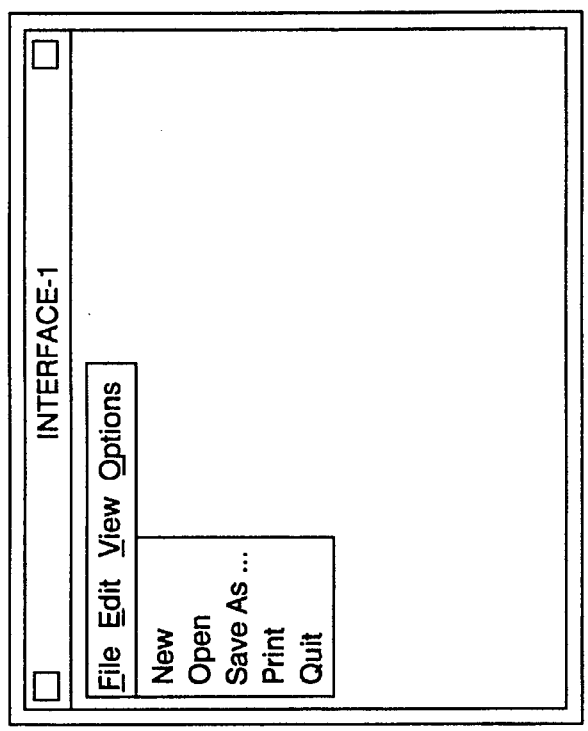
FIG. 10

METHOD AND SYSTEM FOR DYNAMICALLY SHARING USER INTERFACE DISPLAYS AMONG A PLURALITY OF APPLICATION PROGRAM

CROSS-REFERENCE TO RELATED APPLICATIONS

The present application is related to application Ser. No. 08/049,770 filed on the same date at this application, entitled "User Interface Server" by inventors R. Wiss, W. Oldfield, and R. Wierwille (Docket number BT9-92-024), incorporated herein by reference.

BACKGROUND

This invention relates to the dynamic sharing of user interfaces and user interface components by more than one application. More particularly, it allows an application developer to provide an application with a user interface that is independent of any particular window management system.

An application interacts with a user via a user interface. A graphical user interface (GUI) allows a user to interact with a computer using graphics, images, data and text together with some form of pointing device. The GUI is an improvement over the traditional text display and alphanumeric keyboard input device. One of the more popular pointing devices used by a GUI is the mouse. The mouse input device complements the keyboard which can be used for traditional text input and display. The GUI's graphical images are chosen to be intuitive for ease of use, such as a push-button labeled with the image of a file cabinet to denote the action of saving a file. Individual components of the graphical user interface, such as a particular window or a push-button, are selected by using the mouse or any other supported pointing device. Other pointing devices include tablets, touch screen, touch screen overlays, track balls, joy sticks, light pens, thumb wheels etc.

A window management system provides many of the important features of modern user computer interfaces. A window management system allows multiple applications to interact with the user on a single computer display, and provides low level functions for the application to display data and collect input from the user. The window management system permits application programs to show results in different areas of the display, to resize the screen areas in which those applications are executing, to pop-up and to pull-down menus. The window management system is a resource manager in much the same way that an operating system is a resource manager, only the types of resources differ. The window management system allocates the resources of screen area to various applications that seek to use the screen and then assists in managing these screen areas so that the applications do not interfere with one another. The window management system also allocates the resources of interaction devices to applications that require a user input and then routes the flow of input information from the devices to the event queue of the appropriate application for which the input is destined.

The look and feel of the user computer interface is determined largely by the collection of interaction techniques provided for it. Designing and implementing interaction techniques for each individual application would be a time consuming and expensive task. Furthermore, each application would end up with a different look and feel making it difficult for a user to move from one application to another. Applications sharing a common window management system can utilize a common interactive technique toolkit built for the window management system to assure a common look and feel. An interactive technique toolkit consists of a set of subroutines that provide different types of display objects.

Interactive technique toolkits, which are subroutine libraries of interaction techniques, are mechanisms for making a collection of techniques available for use by application programs. By using interactive technique toolkits, a consistent look and feel among application programs sharing a common window management system can be insured. Using the same toolkit across all applications is a commonly used approach for providing a look and feel that unifies both multiple applications and the window environment itself. Interactive technique toolkits are available for specific windowing management systems. For instance, the menu style used to select window operations should be the same style used within all applications. Basic elements of the toolkit can include menus, dialog boxes, scroll bars, file selection boxes and the like, all which can be conveniently implemented in windows.

As previously stated, applications that use a windowed graphical user interface often want to have an identical look and feel for functions that appear in different application contexts. Often these functions are only needed on demand, as the result of a user selection within the GUI. The use of interaction toolkits can be used to partially meet these goals but, have several drawbacks.

The first drawback is that the display objects are completely incorporated into each application program. Many applications share many of the same user interface features and display objects. Currently, each application contains all display objects for its user interfaces. That is, each application contains the sequence of calls to the window management system for generating each display object. Although many applications share the same display objects, each application must contain the calls for generating each particular display object. This replication requires the use of additional space for each replicated object and creates maintenance problems. When the same display object is modified in some way it must be modified in all applications that contain the display object.

For example, OSF/Motif® toolkit provides a FileSelectionBox "Widget" that provides for creation of a File Selection Box. The FileSelectionBox "Widget" is made part of the application program when the application program is created by copying the appropriate widget and code to customize it from the appropriate subroutine library. The code, a sequence of underlying window management system commands, for the widget is copied to the application program and becomes a part of the application program. Thus, each application program that utilizes this widget is compiled with the widget as a part of the application code. Since the widget code is incorporated into the application code a subsequent change to the widget definition in the interaction toolkit (i.e., a change in the underlying sequence of window management system commands) requires modification of all applications that use the widget. Although interaction technique toolkits provide for sharing of certain display features such as widgets, they pose substantial maintenance problems. All instances of the copied code must be identified and uniformly modified if the common look and feel is to be preserved. This problem is compounded when the application program's source code is not available as with many application programs.

A second drawback is that all the code for generating display objects of the application must be contained in the application regardless of their likelihood of use. Suppose a GUI for a given application consists of a hierarchically related set of windows and the application allows the user to traverse through or select a given window from a main window. Certain windows in the hierarchy are not going to be seen by the user in the course of a session. For instance, in a word processor application, the set printer parameters window will in most cases be executed only rarely. Using an interaction toolkit, however, all the code for generating display objects including those that are rarely shown to the user are contained in the application. This is because the application program contains its own copy of the code that creates any display objects and their associated data structures. This can cause a great deal of memory to be used by a single application. Memory is at a premium with most window management systems, so that any increased use is costly in terms of system performance.

A third drawback is that applications must be partially rewritten in order to assure that their user interfaces operate on a different window management system. The window management system specific portions of the application need to be adapted to the new windowing system or the new window management system implementation. Limitations of the old or new window management system may result in a change in the look and feel of the application.

Currently many applications have user interfaces that are written for a particular window management system. For example, a word processing application written to run under WINDOWS™ window management system will not run under X WINDOWS. The word processing application would need to be at least partially rewritten in order to run under X WINDOWS. These changes can be costly in terms of time and money. It also leads to the need to maintain two different versions of the word processing application, one for WINDOWS and one for X WINDOWS. With several window management system specific implementations of the same word processing application there is also the potential that the "look and feel" of the application will change across these implementations. These problems are compounded when a developer offers a variety of associated applications such as word processing, spread sheet, graphics programs, data base programs, grammar checkers, spell checkers etc.

A fourth drawback is that sharing is only permissible on a very low level. Returning to the X windows OSF/MOTIF example explained above, it is clear that interactive toolkits provide for the use of similar widgets across applications by replicating the widgets into each application. However, these widgets are low level display objects. Applications may have more than just widgets in common. For instance, several different applications may contain a printer setup interface or series of windows for setting up or adjusting the printer. The printer setup interface constitutes a collection of display objects that are shared by multiple applications. However, the interaction toolkits do not provide for sharing at this level unless it is by sharing the common code via replication of the code in each application. The sharing of common code has drawbacks previously mentioned. Also the printer setup interface would have to be rewritten if the application is to be used with other window management systems.

A fifth drawback is that most window management systems do not provide for support of interpretive applications. Some applications run in an interpretive mode. These applications are compiled and run on the fly. Most window management systems do not support interpretive applications. Most window management system only provide for interaction via a compiled subroutine library. Thus, interpretive applications must provide a mechanism for translating the application user interface display commands to a compiled subroutine call.

Several alternatives have been proposed to overcome these drawbacks. One alternative is to replicate the common sub-hierarchy of display objects in each user interface as it is stored in a display object store. Unfortunately, while this is only mildly inefficient during initial application development, it poses substantial maintenance problems. All instances of the copied common sub-hierarchy must be identified and tracked if a common look and feel is to be preserved across all applications. Maintenance also becomes an issue because changes must be propagated to all instances of the common sub-hierarchy.

Another alternative permits sharing of common sub-hierarchy of display objects at the display level. The applications share a single instance of the common sub-hierarchy at runtime. If this is done without sharing at the user interface display object store level, all the maintenance problems of the previous alternative still apply. If sharing is done at both the display level and the user interface display object storage level, the application no longer has separate objects at the display level that can be controlled and modified independently of the duplicate sub-hierarchy that is displayed. The applications could not then individually tailor or modify the common display object shared during runtime.

Still another alternative is to reference the common sub-hierarchy of display objects from a display object store instead of from the application. This is accomplished by storing a reference to the display object store that indicates the common sub-hierarchy that is to be shared. Unfortunately, this results in fixation in the display object store of the overall user interface hierarchy for a given application. Thus, the application losses dynamic control of the user interface.

A further alternative is to extract the common sub-hierarchy of display objects, creating a separate user interface in the display object store. This new user interface can now be included in a loaded interface, given a user interface server that provides such a function. This, however, requires changes to the original interface, to remove the sub-hierarchy, and changes to the applications, which now have to include the separate sub-hierarchy. Additional difficulties occur when user interfaces share sub-hierarchies which are not identical, but have some overlap. This results in either extracted sub-hierarchies with some duplicate components that have to be maintained synchronously, or multiple levels of extracted sub-hierarchies to arrive at least common denominators of display objects. Both of these results are difficult to manage, and the latter means more changes to applications as their user interfaces evolve.

For the forgoing reasons, there is a need to provide for the dynamic sharing of user interface components.

SUMMARY

The present invention is directed to a method and apparatus that satisfies these needs.

It is therefore an object of this invention to provide for the dynamic sharing of user interfaces.

It is another object of this invention to provide for the dynamic sharing of portions of user interfaces.

It is a further object of this invention to provide for an application to be written so that it can be easily run with a variety of different window management systems without revising the application's source code.

It is still another object of the invention to reduce the memory requirements of an application's user interface by permitting dynamic loading of user interfaces.

It is yet another object of the invention to provide for the dynamic loading of portions of a user interface.

It is still another object to provide interpretive applications with windowing management system support.

It is another object of the invention to provide for a common look and feel across applications regardless of the platform or window management system implementation.

It is another object of the invention to provide for the serialization of events for applications executing across multiple processes.

It is still another object of the invention to support concurrent execution of multiple applications.

The foregoing and other objects of the invention are accomplished by an apparatus and method providing for the dynamic sharing of user interfaces and portions of user interfaces. These objects and others are accomplished by a user interface server which interfaces with applications, a display object store, and a window management system to provide for the dynamic sharing of user interfaces and portions of user interfaces.

BRIEF DESCRIPTION OF THE DRAWINGS

These and other objects, features, aspects, and advantages of the present invention will become better understood with regard to the following description, appended claims and accompanying drawings where:

FIG. 6h shows the user interface server response to window management system event.

FIG. 6i shows the user interface server response to an application returning from a callback.

FIG. 8b shows "INTERFACE-1" as stored in DOS.

FIG. 9b shows "INTERFACE-2" as stored in DOS.

FIG. 10 shows a display showing application A's "INTERFACE-1" and Application B's "INTERFACE-1".

DETAILED DESCRIPTION

Definitions

Figure 1:
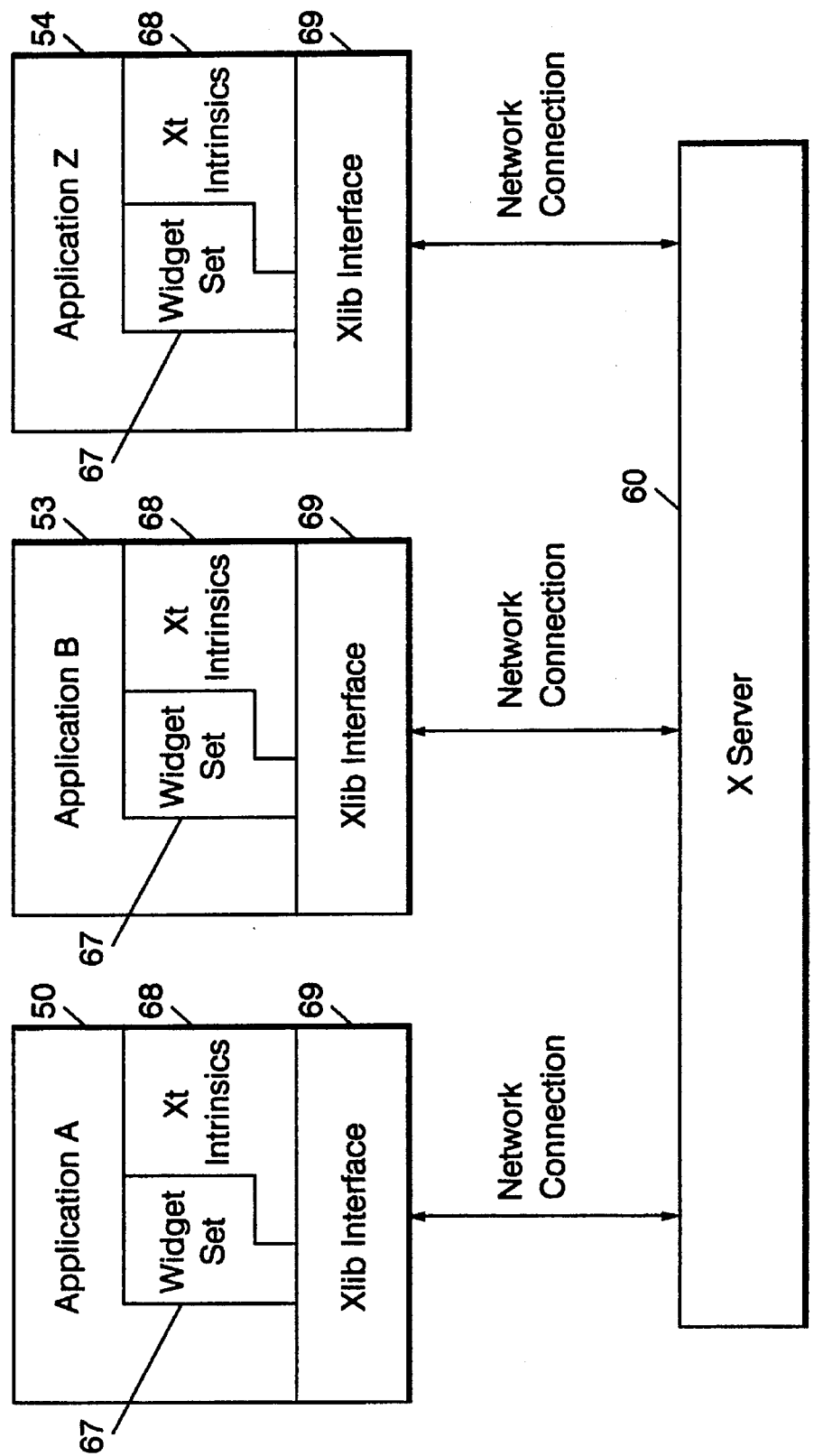
FIG. 1 is a block diagram showing the interaction of X Windows applications with the X Windows Server.

"User Interface" is a hierarchy of user interface components. A user interface contains user interface components that comprise a graphical user interface. The term user interface may refer to the actual appearance on the display or a representation in working memory or a representation in the display object store. The hierarchy may be a multi-level hierarchy with children having children. The root component is typically a primary window component. All other display components are children of the root. They may all be first generation children (i.e., a two level hierarchy) or multi-generational (i.e, more than two levels). The components are structured in a hierarchy, also referred to as a tree. An example of such a structure is a 'family tree' of genealogy. The components of the tree are connected to other tree components. Tree components can have a 'parent' (the component it belongs to) and 'children' (components that belong to it). A sub-hierarchy, or sub-tree, is any specified component and all the children under it including children's children, and so forth.

"User interface component" this term refers to the individual visual pieces of the interface or grouping of pieces of the interface or a representation thereof. A component can be either a high level component (i.e, a window) or a low level component (i.e, pushbuttons, menus, and text labels). Components may also be categorized by their relationship to other components. Container components refer to components that contain or control other components. Container components are described as being parents of the components that are within their control or within their physical boundaries. Primitive components make up the lowest level of a given hierarchy or subhierarchy and cannot contain other components. Composite components are groupings of container components and primitive type components.

"Resources" are associated with a user interface component. Resources refer to specific attributes of a given component. Examples of resources include its foreground color, background color, name, font, parent, pixmaps, icons etc. Some resources are common to all components some are common to a subset of components, and some are specific to a given type of component.

"Callbacks" are a special class of resources. Callbacks provide a means for associating application specific functionality with a user interface component. A callback is associated with a particular user action in a component. Each component type which is responsive to user input supports one or more callback types. For example, an application would typically have some processing to perform when a user selects a push button displayed in the application's user interface. Typically two resources are specified for a particular callback type: the callback and the callback data. The application developer specifies the callbacks required for the user interface when the application is created. The name of the application function for callbacks is stored with the user interface components in the display object store but can be modified by the application.

"Display Object" is a data abstraction representing a visual characteristic or the visual characteristic itself. A display object can be a plurality of user interfaces, a single user interface, a plurality of user interface components, a hierarchy or sub-hierarchy of user interface components, a single user interface component or a resource such as a pixmap or icon.

"Command" includes the instruction to be executed along with any required data. For instance, a load command must specify the user interface to be loaded. The required data for the load command may consists of the name of the user interface or a reference to another location that contains the name or a reference to the user interface itself.

Overview

Figure 2:
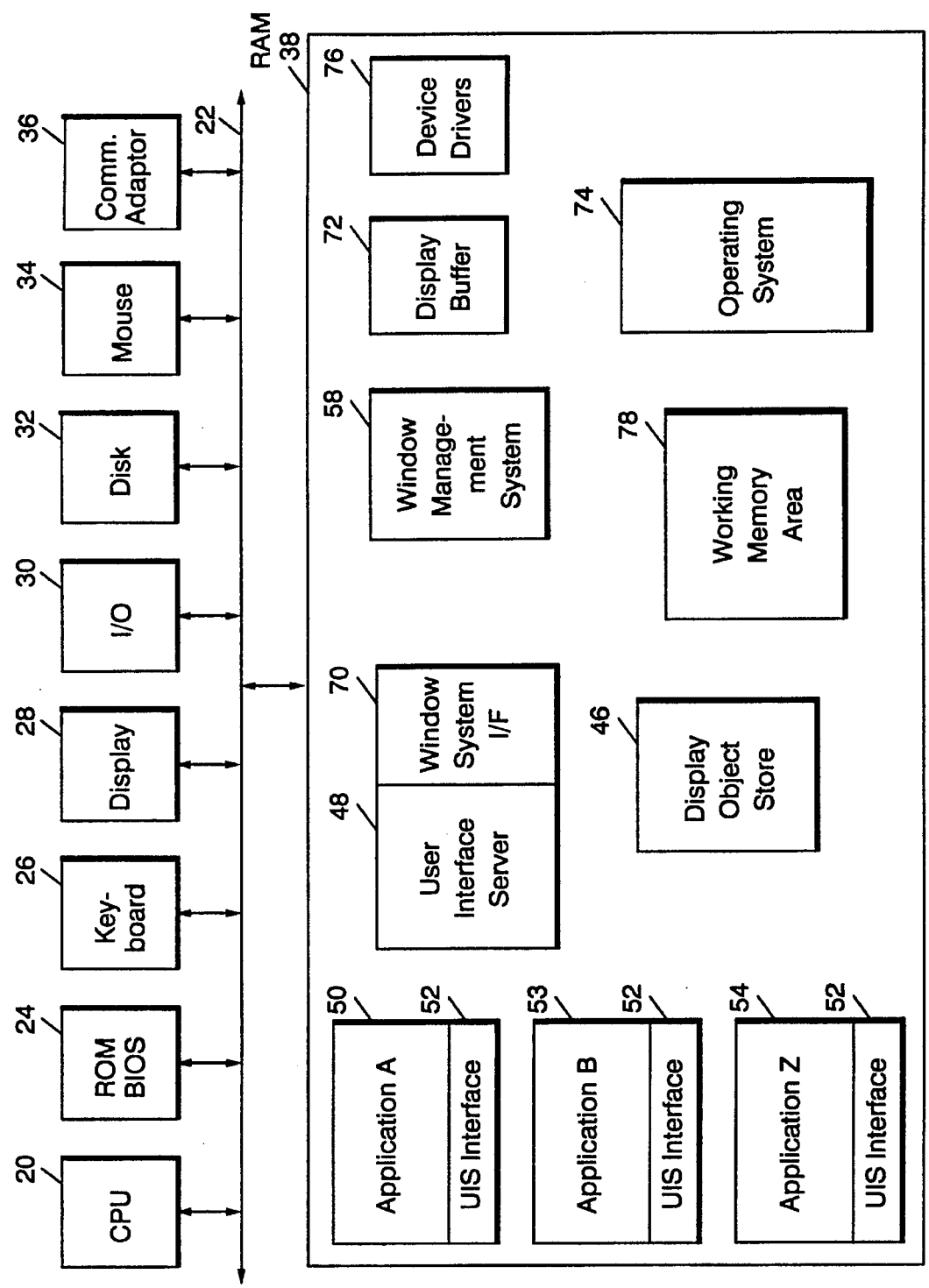
FIG. 2 is an architectural block diagram of a computer system in accordance with the present invention depicting the memory having read therein a series of applications and an operating system.

The preferred embodiment of this invention comprises a set of computer programs for controlling the interaction between a user and a computer system as shown in the architectural block diagram of FIG. 2. FIG. 2 includes a central processing unit (CPU) 20 connected by means of a system bus 22 to a read only memory (ROM) 24 and a random access memory (RAM) 38. Also included in the computer system in FIG. 2 are a display 28 by which the computer presents information to the user, and a plurality of input devices including a keyboard 26, mouse 34 and other devices that may be attached via input/output port 30. Other input devices such as other pointing devices or a voice sensors or image sensors may also be attached. Other pointing devices include tablets, numeric keypads, touch screen, touch screen overlays, track balls, joy sticks, light pens, thumb wheels etc. The I/O 30 can be connected to communications lines, disk storage, input devices, output devices or other I/O equipment.

The RAM 38 includes application A 50, application B 53, application Z 54. Each of these application programs utilizes a user interface server interface 52. The user interface server interface 52 allows applications to access functions and data contained in the user interface server 48. Examples of typical application programs would include a word processor, spreadsheets, graphic programs, electronic mail and data base programs. Also located in RAM 38 is the user interface server 48. The user interface server 48 utilizes a window management system interface 70 to provide access to the window management system 58. A display object store 46 contains user interfaces with each user interface containing a plurality of user interface components. The user interface server retrieves user interfaces and portions of user interfaces from the display object store 46 in response to application commands.

An operating system 74 is also included in RAM 38. Examples of operating systems include AIX and OS/2. The RAM 38 includes a window management system 58 such as the X window management system for AIX® or Presentation manager™ for OS/2. It is the operating system 74 in conjunction with the window management system 58 that allows applications to be running concurrently and to share the same interaction devices. It is the user interface server 48 in conjunction with the display object store 46 that permits sharing of user interfaces and portions of user interfaces. Other elements shown in RAM 38 include drivers 76 which interpret the electrical signals generated by devices such as the keyboard and mouse.

A Working memory area 78 is also shown in RAM 38. The Working Memory Area 78 can be utilized by any of the elements shown in RAM 38. The working memory area can be utilized by the applications (50, 53, 54), window management system 58, user interface server 48, OS 74 and other functions. The working memory area 78 may be partitioned amongst the elements and within an element. The working memory area 78 may be utilized for communication, buffering, temporary storage, or storage of data while a program is running. For instance, the user interface server 48 utilizes the working memory area 78 for loading and operating on user interfaces retrieved from the display object store 46. The working memory area 78 may also be utilized by the operating system for multi-tasking purposes. The working memory area 78 can be included as part of the application or it may be located in a common area. In either case there is no requirement that the working memory be contiguous in RAM 38.

Figure 3:
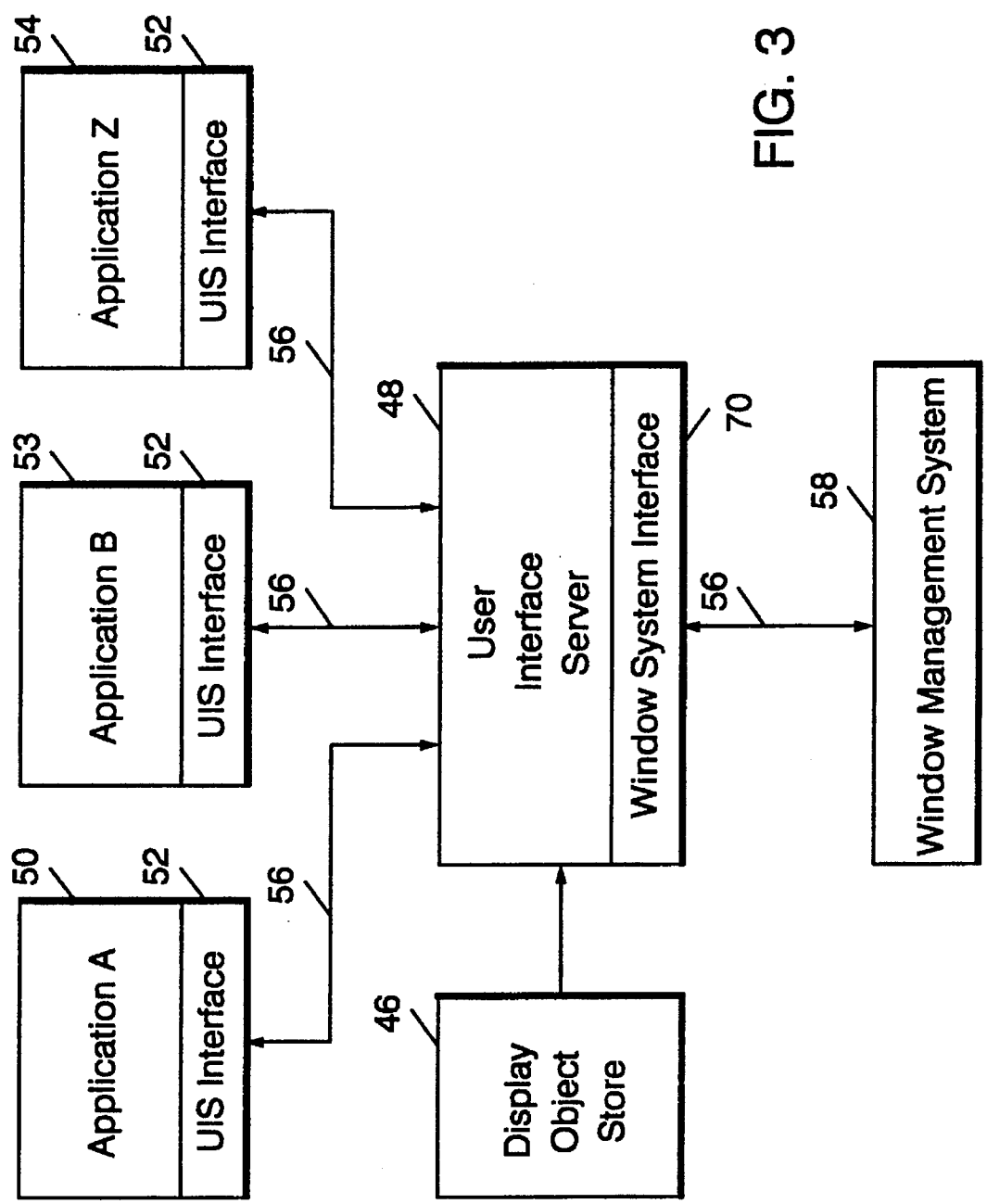
FIG. 3 shows a block diagram depicting the functional relationships of the invention.

FIG. 3 shows a user interface server 48 coupled to the applications 50, 53, 54, the window management system 58, and the display object store 46. The functional relationships between these elements is shown FIG. 3. The user interface server 48 provides the applications with the ability to load user interfaces which have been previously created and stored in the display object store 46. The user interface server 48 provides a run-time interface between the window management system 58 and the applications. The user interface server 48 is capable of handling multiple applications each with multiple user interfaces.

The user interface server also provides applications with the ability to load a portion of an interface and attach it to a previously loaded interface. Each application 50, 53, 54 can modify interfaces which have been previously loaded by the user interface server 48 from the display object store 46 and can control the behavior of the interface. Although different applications 50, 53, 54 can share the same user interface as stored in the display object store 46, they may each separately tailor the interface after it is loaded by the user interface server 48. The user interface server 48 loads separate copies of each shared interface into the working memory area 78 for each application currently using the shared interface. Since applications may have several user interfaces it is possible that multiple copies of a user interface will be loaded for a single application. Each would be separately modifiable by the application.

As shown in FIG. 3, the applications 50, 53, 54 are coupled to the user interface server 48 via interconnecting means 56. Each application issues commands to the user interface server via the user interface server interface 52. The user interface server interface 52 is part of the application. The user interface server interface 52 provides a set of commands that permits each application to individually control the behavior of their user interfaces and receive information from the user interface server 48. The user interface server interface 52 provides each application with the functions necessary to control and modify its user interfaces. Each application can issue any of the set of commands to be carried out by the user interface server 48. This provides an application development language by which each application has the ability to control the behavior of its user interfaces.

The user interface server 48 services the commands issued by each application. These commands can include: initialization; loading of user interfaces; attaching portions of user interfaces to previously loaded user interfaces; deleting loaded user interfaces or portions of loaded user interfaces; modification of loaded interfaces; querying; initializing default values; and the displaying and undisplaying of user interfaces and user interface components. It is the application's use of these commands that provide for dynamic use of user interfaces and window management system independence.

Additionally, the user interface server interface 52 also provides a mechanism for each application to receive appropriate information about user actions. Suppose application A currently has displayed a user interface that contains a list of menu items. If a user selects a menu item shown on the display means with a mouse, the appropriate function in Application A for handling this selection would be invoked in response to the user selection. The name of the application function to invoke is provided by means of a callback resource associated with the particular menu item.

The communicating means 56 provides for two way communication between the user interface server and the applications and between the user interface server and the window management system. Interconnecting means 56 can be inter-process communications as provided by the operating system 74 or an alternative such as procedure calls or shared memory. Note that although the interconnecting means are labeled with same number in FIG. 3, the interconnecting means are not required to be the same for each link. Each application can use a different interconnecting means and the user interface server to window management system interconnection may use an entirely different interconnecting mean than that utilized by any of the applications.

Interconnecting means 56 also provides the capability for an application to be located on a remote system with its user interface presented on the platform containing the user interface server 48. The remote application communicates to the user interface server 48 via its remote user interface server interface to the remote communication adaptor (not shown) which communicates to the local communications adaptor 36 which communicates to interconnecting means to the user interface server 48. This remote connection provides for two-way communication. Thus applications do not have to be located in the same system as the user interface server. This flexibility is due to the server nature of the user interface server.

The user interface server 48 also is coupled to the windowing management system 58 by interconnecting means 56. The window management system 58 provides the display management functions such as displaying data and collecting input from the user via the input means. The window management system 58 permits the user interface server 48 to show results in different areas of the display, to resize the screen areas in which those user interfaces of particular applications are executing, to pop-up and to pull-down menus. The window management system is a resource manager in much the same way that an operating system is a resource manager, only the types of resources differ. The user interface server 48 utilizes the window management system's 58 capability to manage display resources. The user interface server 48 interacts with the window management system 58 as an agent for the applications 50, 53, 54.

Figure 4:
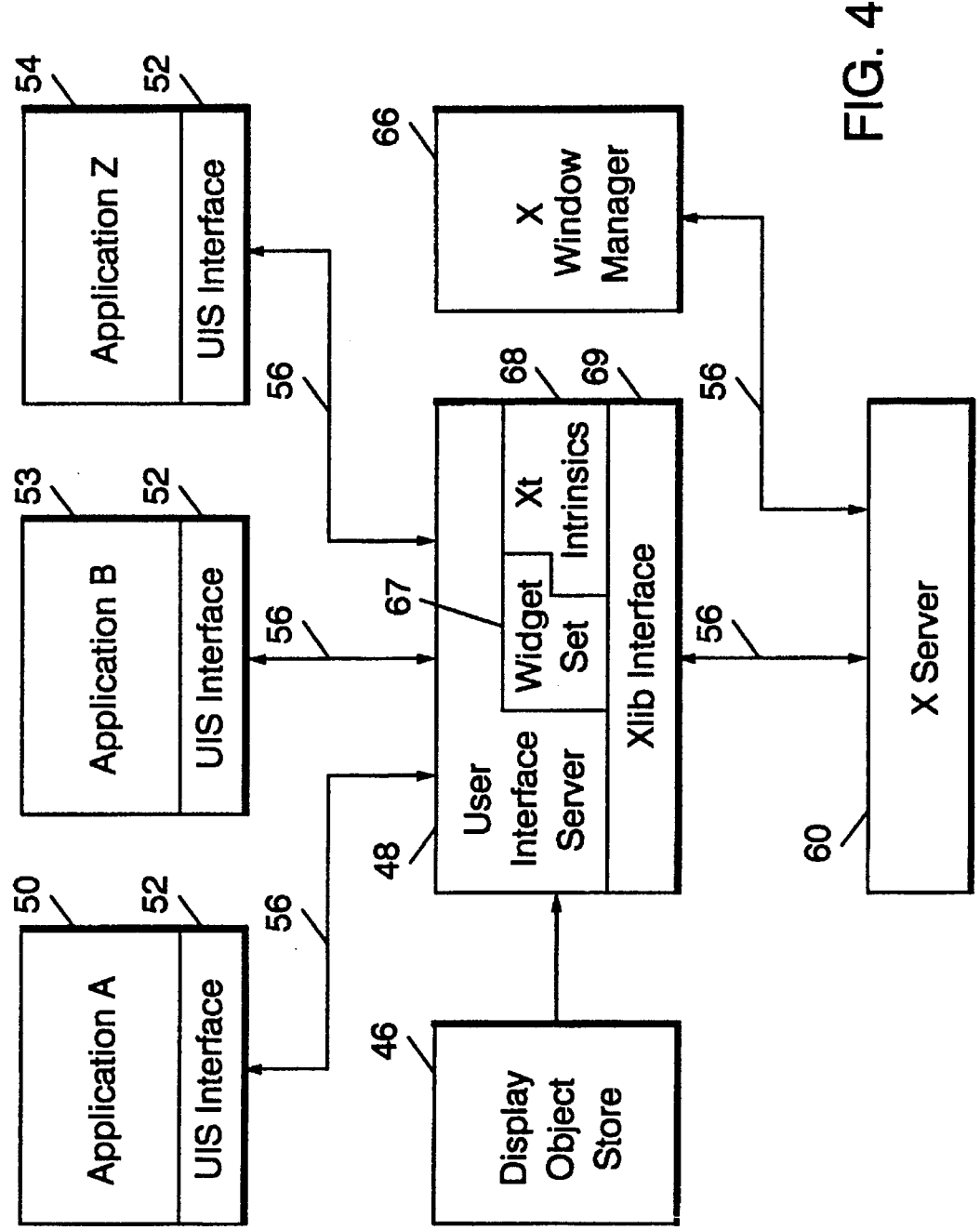
FIG. 4 shows a block diagram depicting the functional relationships of the invention for a particular window management system.

The user interface server 48 communicates with the window management system via the Window System Interface 70. This window management system interface 70 is part of-the user interface server and is dependent on the particular window management system 58 selected. By placing window management system specific functions in the user interface server, the applications are free from particular window management system dependencies. The window management system interface may consist of a set of library routines for interfacing with the window management system or a higher level interaction toolkit or both. An example for the X Windows system is shown in FIG. 4.

Although the user interface server 48 would have to be modified to work with a different window management system, the applications themselves would not. Each application's user interfaces are controlled and managed via commands issued through the user interface server interface 52. These functions implemented by these commands are supported by the user interface server on any window management system to which the user interface server has been ported. Thus the user interface associated with each application is independent of the window management system.

An important advantage of this invention is that the application can dynamically specify sharing. Most applications have user interfaces that consist of sub-hierarchies of user interface components. Often a sub-hierarchy is only needed on demand, as the result of a user selection within the user interface. For example, assume a user interface contains a menu with a list of several choices, one of which when selected causes a print function to be invoked. The corresponding application may be set up so that if the user selects the print function the application will command the user interface server to load the print sub-hierarchy from the display object store and attach it to the appropriate location of the already loaded user interface containing the menu list and then display the print sub-hierarchy. If the user then makes a selection that causes the print function to no longer be needed (i.e, exit print function) the application can issue a command to the user interface server to delete the sub-hierarchy from the working memory area or to modify the working memory area so that the sub-hierarchy is no longer displayed.

The User Interface Server (UIS)

The user interface server provides a front-end to the window management system for the applications. The UIS loads the user interface at runtime, controls the display of the user interface (sending commands to the window management system to have the user interface rendered on the display), and provides the mechanism for interaction between the user and the application.

The UIS is an event driven application. Events can be initiated by applications or by user interface events initiated by the user as processed by the window management system. In the case of user generated events information may be passed from the window system to the UIS. The UIS may then provide information to the appropriate application based on the event generated by the user. With events initiated by application. s, the UIS responds to commands sent from the applications via UIS Interface 52. These commands can include: initialization, loading and deleting user interfaces; attaching and deleting portions of user interfaces; modification of loaded interfaces; querying; and the displaying and undisplaying of user interfaces and user iinterface components.

As stated previously, the UIS interface 52 also provides a mechanism for each application to receive appropriate information about user actions. If a user selects a menu item from application A's user interface as shown on the display means with a mouse, an application function associated with application A would be invoked as a result of the user's selection. The name of the application function to invoke is provided by means of a callback resource associated with the particular menu item selected by the user. This is accomplished by the UIS first registering a callback for the menu item component with the window management system. The callback can be registered when the component is loaded or when it is displayed or in response to a modification command. When the user selects the menu item with the mouse (e.g., by moving the pointer onto the menu using the mouse and depressing a mouse button) the window management system provides a callback to the UIS that invokes a UIS function and provides a pointer to a UIS data area and any callback data associated with the user action (every type of callback has its own associated callback data type). Both the UIS function name and the pointer are provided to the window management system when the callback is registered. The data area pointed to by the data pointer enables the UIS to determine which application and which user interface is to receive the information about the user selection and the name of the application function to invoke. The application function is invoked by a callback from the UIS to application A.

It should be noted that there are a variety of alternative methods to cause invocation of the specific application function. Callbacks provide one technique for invoking application specific functions associated with particular user interface events.

Figures 2, 6A:
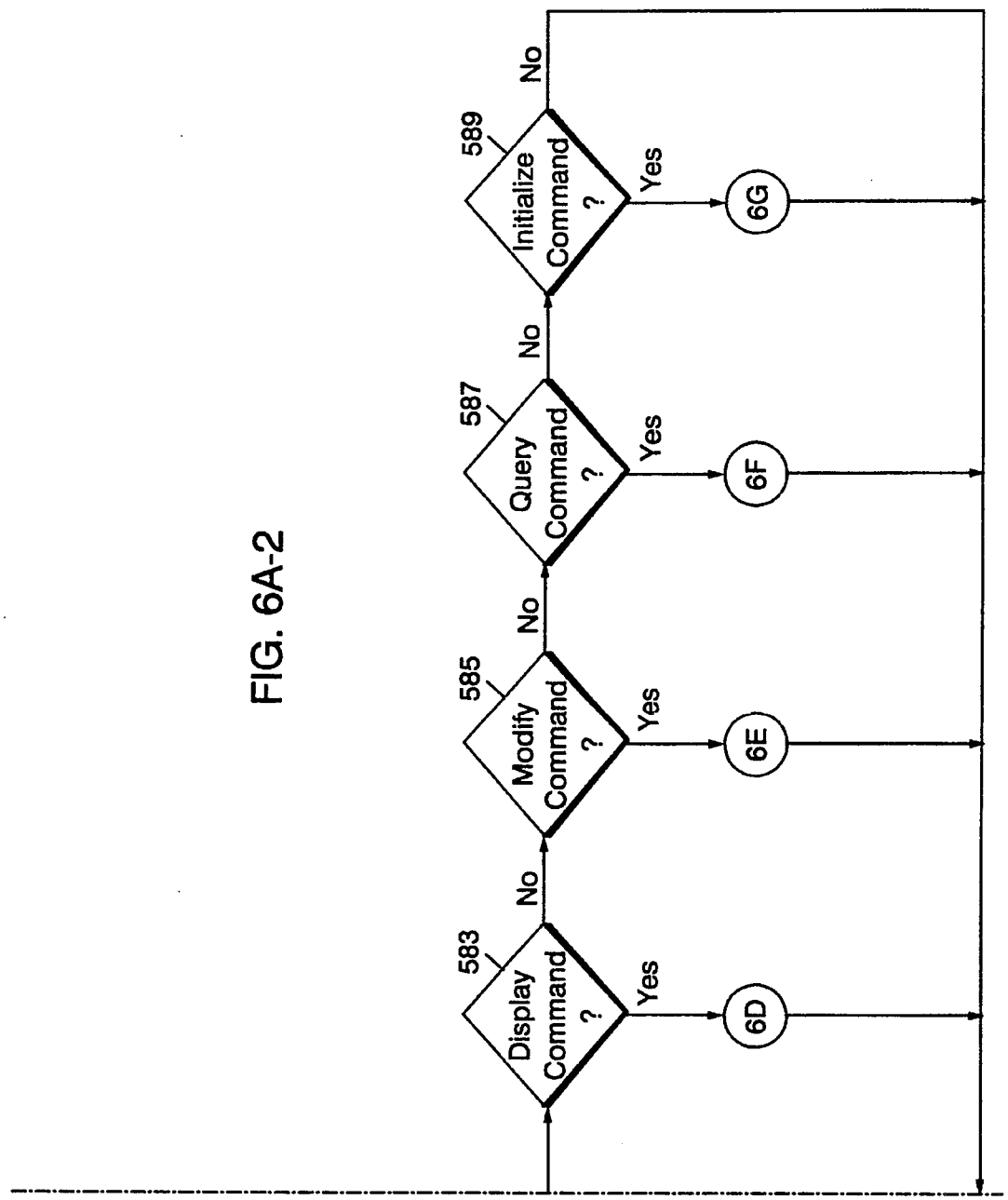
FIG. 6a shows the main flowchart of the user interface server.

FIG. 6a shows the overall flow of the UIS. In step 571 the UIS initializes itself. During this step the following may be performed: calls necessary to initialize the windowing system, calls necessary to establish communication with the applications, calls to register the functions which execute the commands supported by the UIS and to register the response handling for commands returning from execution by an application. Also the UIS may initialize internal control data structures.

After initialization the UIS enters into an event processing loop. The implementation of this loop is operating system dependent and is constructed such that input from either the windowing system or the applications is detected. When an event is detected steps 573, 575, and 577 determine which type of event has occurred and call the appropriate routine. If the event is from the windowing system, step 575 processes these events in accordance with steps described in FIG. 6h. If the event is a command from an application, the step 577 in conjunction with steps 579, 581, 583, 585, 587, 589 determines the command type and takes the appropriate steps as described in FIG. 6a or 6b or 6c or 6d or 6e or 6f or 6g. If the event is a response to a previous callback sent from the UIS to an Application, step 577 processes the response in accordance with steps described in FIG. 6i. After the event has been processed control is returned to the operating system until another event occurs. An embodiment of the UIS showing part of the high level psuedocode for certain UIS functions is listed in TABLE I.

Figure 6D:
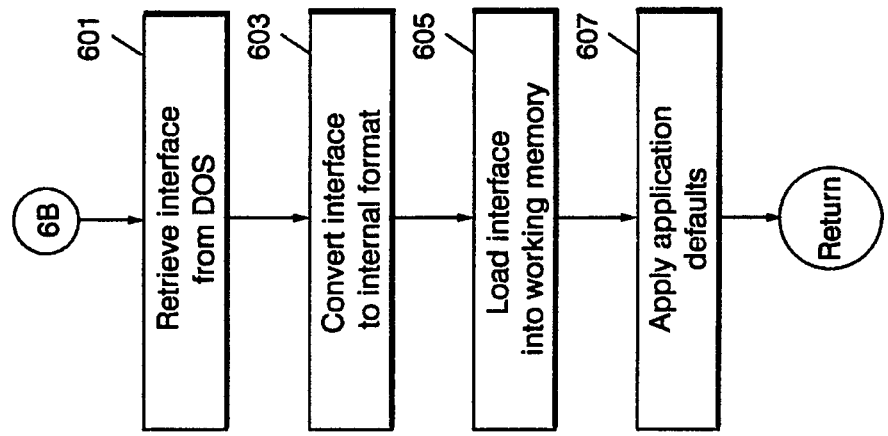
FIG. 6d shows the user interface server response to a display command.
Figure 6C:
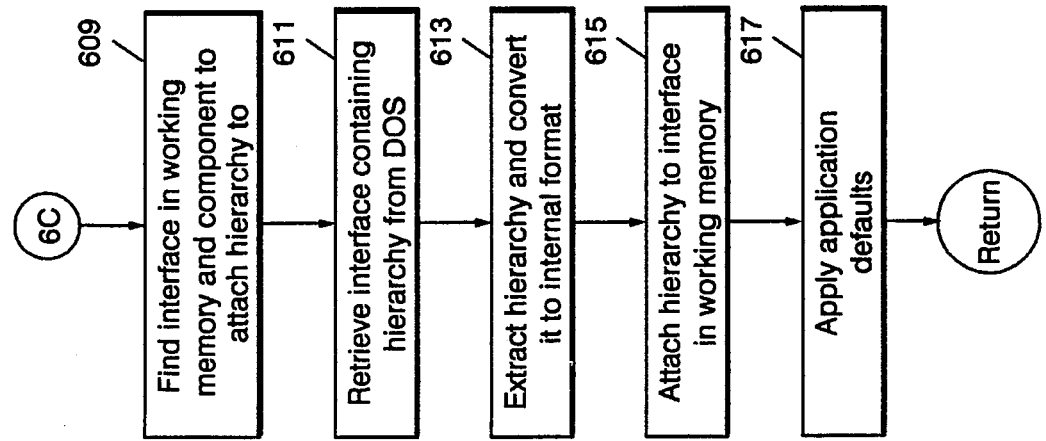
FIG. 6c shows the user interface server response to an attach command.
Figure 6B:
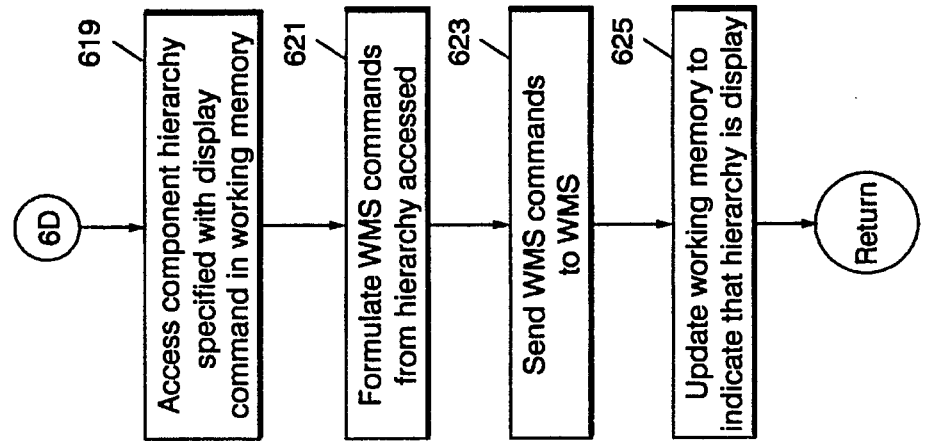
FIG. 6b shows the user interface server response to a load command.

The high level flow of the UIS response to certain application commands is shown in FIG. 6b, 6c, 6d, 6e, 6f, 6g. FIG. 6b depicts the UIS response to a load command issued by an application. In step 601 the UIS retrieves or causes the display object store to retrieve the user interface specified by the Application in the load command. In step 603 the UIS converts the user interface from its stored format to its internal hierarchical format. In step 605 the UIS loads the newly converted user interface into the working memory area. In optional step 607 the UIS applies the default values for the requesting application to the User interface in the working memory area. Step 607 may be combined with either of the two previous steps. Steps 603 and 605 may also be combined into a single step. Step 607 may also include formulating and sending appropriate commands to the window management system. Window management system commands include setting up window management system data structures, the registering of callbacks, rendering the user interface on the display etc. The window management system commands may be formulated or sent when the user interface is loaded or when the user interface is displayed (See FIG. 6d).

FIG. 6c depicts the UIS response to an attach command issued by an application. In step 609 the UIS locates the component in working memory area that the sub-hierarchy is to be attached to, as specified in the attach command. In Step 611 the UIS retrieves or causes the display object store to retrieve the user interface that contains the subhierarchy. In step 613 the UIS extracts the sub-hierarchy and converts the sub-hierarchy from its stored format to its internal hierarchical format. In step 615 the UIS attaches the sub-hierarchy to the component located in step 609. In optional step 617 the UIS applies the default values of the requesting Application to the sub-hierarchy in working memory area. Step 617 may be combined with either of the two previous steps. Step 609 can be performed at any time prior to step 615. Although in step 613 the user interface containing the sub-hierarchy can be converted prior to extraction of the sub-hierarchy it is more efficient to extract the sub-hierarchy first and then convert only the extracted sub-hierarchy. Step 617 may also include formulating and sending appropriate commands to the window management system. Window management system commands include setting up window management system data structures, the registering of callbacks, rendering the user interface on the display, etc. The window management system commands may be formulated or sent when the user interface is attached or when the user interface is displayed (See FIG. 6d).

FIG. 6d depicts the UIS response to a display command issued by an application. The Display command can specify that an entire user interface or a sub-hierarchy represented by a component be displayed or undisplayed. Alternatively, the display command may also specify that an individual component be displayed or undisplayed. In step 619 the UIS accesses working memory area and locates the component or sub-hierarchy of components specified by the display command. Steps 621, 623, and 625 are repeated for each component. In step 621 the UIS formulates the window management system commands necessary to display or undisplay the current component. In step 623 the UIS issues these commands to the window management system. The commands sent to the window management system cause the user interface component to be rendered on the display means. Working memory area is then updated in step 625 to indicate the display or un-display status of the component. Alternatively, the window management system commands may be formulated and sent to the window management system when the user interface or sub-hierarchy is loaded, in place of a separate display command.

Although not shown in FIG. 6, the user interface server can also delete user interfaces and portions of user interfaces previous loaded in working memory. The application would issue a delete command that specifies the user interface to be deleted. This could be accomplished by specifying the root component of the loaded user interface. Portions of a loaded user interface could be deleted by sending a delete command with a specified user interface component. The user interface server would locate the component in working memory and delete the component and its children.

Figure 6G:
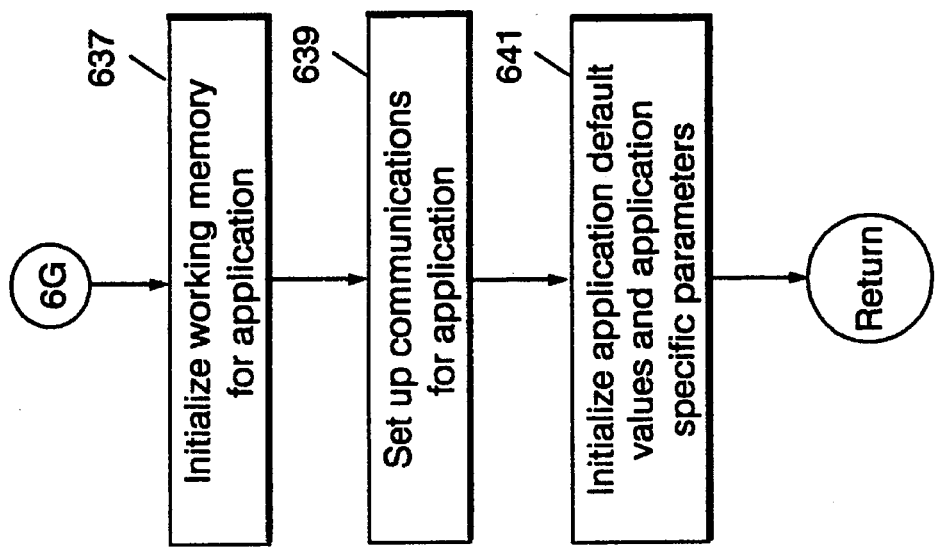
FIG. 6g shows the user interface server response to an initialize command.
Figure 6F:
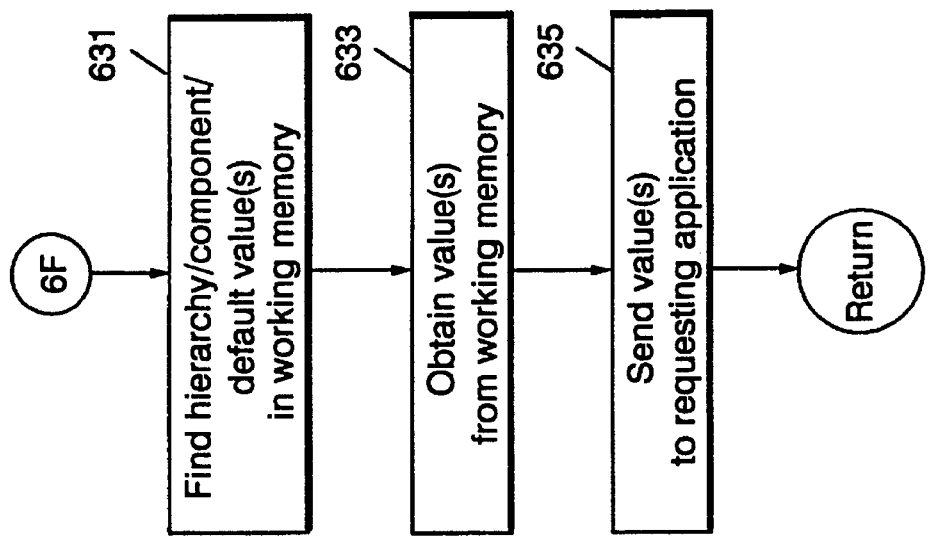
FIG. 6f shows a flowchart of the user interface server response to a query command.
Figure 6E:
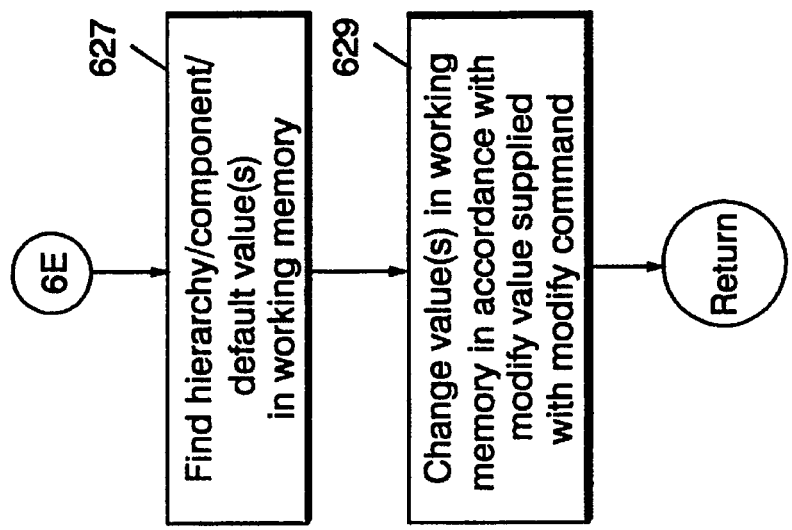
FIG. 6e shows a flowchart of the user interface server response to a modify command.

FIG. 6e depicts the UIS response to a modify command issued by an application. The modify command allows an application to modify the resources of loaded user interface components. For example, a component that consists of a push button may be modified so that one or more of its resources is modified. Such a modification command could change the color or the text or the font resource or all or any subset of the resources associated with the component. The modification command can also be utilized in conjunction with callbacks. Thus the application can utilize the modification command to provide the name of the application function that is to be invoked when a callback occurs. In step 627 the UIS locates the component in working memory area. In step 629 the UIS applies the modification by modifying the component's resource value specified by the modify command to the value provided with the modify command. The value of the resource is changed in working memory area. Step 629 may also include formulating and sending window management system commands to reflect these changes. The modify command can also be used to change default values that apply to more than one component or default values associated with an application or to change default values associated with a particular component type.

The use of modification commands and application defaults by the applications promotes increased sharing of user interfaces because each application can share a particular user interface stored in the display object store and tailor that shared interface with modification commands after the user interface has been loaded. In this way the applications share the user interface as stored in the display object store, but the UIS loads a separate copy of the user interface into the working memory area for each application issuing a load command so that they each may separately modify their own respective copy. Thus the appearance on the screen of an interface shared by more than one application may differ because each application can separately modify their individually loaded user interfaces.

FIG. 6f depicts the UIS response to a query command issued by an application. In step 631 the UIS locates the component(s) or default value(s) that is the object of the query. The query object may be located in working memory area or the display object store. The UIS obtains the value(s) associated with the query object in step 633. In step 635 the UIS sends the value(s) to the requesting application.

FIG. 6g depicts the UIS response to an initialization command issued by an application. The initialization command allows the application to set default values for user interface components and resources common to more than one component. In response to an initialization command the UIS can initialize a working memory area, step 637; setup or initialize communication for the application with respect to the window management system step 639; and/or initialize default values and other application specific parameters step 641.

It should be noted that all the above described commands are not required to dynamically share user interfaces or portions of user interfaces, but are desirable features (i.e., initialization and query). Some of the commands can be combined into a single command. For instance the load and display commands could be combined into a single load command. Other commands could be added to increase flexibility of the invention.

FIG. 6h depicts the response of the UIS to window management system events. In step 643 as a result of processing the event, and a previous callback registration, the window management system invokes or causes the invocation of the UIS function responsible for handling the callback. The UIS function may also receive callback data associated with the event. In step 645 the UIS function determines which application and which user interface the event should be routed to, the name of the component and assembles parameter values for a callback from the UIS to the application. This step may also entail the UIS function querying the window management system for additional information. With certain types of events the UIS function may also mark the particular interface, from which the event was generated, as insensitive until the application function invoked by the callback completes. Thus step 646 can be used as a screening or filtering step so that not all events are forwarded to the application. If the UIS function determines that the event should be discarded then in step 649 the event is discarded. This could be the case where the user interface is marked as being insensitive because it is currently executing a call back. If the event is not to be discarded then in step 647 the UIS executes or causes to be executed the application function associated with the callback. The UIS function invokes the application function but does not wait for the application to complete. The name of the application function that is invoked is provided to the UIS from the callback resource associated with the component. This resource can be set when the interface is loaded or by a modification command that modifies the callback resource.

FIG. 6i demonstrates the steps taken when the application function has finished processing the callback. In step 651 the UIS responds to the event of the application returning from processing the callback. In step 653 the UIS checks to see if the user interface was deleted by the application function. If the user interface was not deleted then the UIS function marks the user interface as sensitive permitting it once again to receive callbacks.

FIG. 6h and FIG. 6i demonstrate the UIS ability to maintain serialization of events for applications executing across multiple processes and support concurrent execution of multiple applications, each having a user interface.

The steps in FIG. 6 are shown to demonstrate various features of the invention. Many of these steps may be combined in a single step or eliminated.

TABLE I

```
main:
    initialize:
        initialize windowing system
        initialize interface to Application
        call initialize_storage_manager
        call initialize_component_manager
        initialize state control and environment data structures
    do forever    /* enter event processing loop */
        wait for user interface event
            or application command or application response
        if user interface event /* event from windowing system */
            call process_event
        else if Application command /* command from Application */
            call invoke_command
        else if Application response /* response from Application */
            call response_handler
```

TABLE I-continued

```
end if
end do
end main

/* process events from the windowing system */
process_event:
for each pending event /* 0 or more than one event possible */
    get event from windowing system
    if interface is sensitive or event will only modify the
            displayed interface
        call windowing system to process event
    end if /* else discard event */
end for
return /* there are a number of different callback routines which send
commands to the Application -- they differ in the format of
the data they send as parameters. All of them send the data
specified in the generic_callback. Other callbacks send
additional data relevant to their type of callback (i.e.,
the selection_callback additionally sends a list of selected
items) */
generic_callback:
get specific interface using callback client data
if interface is not sensitive
    return
    convert callback reason from windowing system value to
        application language value
get component data using callback client data
get component name from component data
get application command associated with this callback from
    component data
get application command user data associated with this callback
    from component data
set interface to not sensitive
send Application command to Application passing component name,
    callback reason, and user data as parameters & specifying
    response_handler as function to call when Application
    command has returned
return /* user interface callbacks are executed asynchronously and when
        they finish control is returned to response_handler      */
response_handler:
        if an unload_interface command has not been received for this
                    interface
            set the interface sensitive/* sensitive to user i/f events    */
                if a modal message dialog has been deleted
                    send a response to the create_message_dialog command
                    remove message dialog from message stack
                end if
        else
            remove interface from unload list
            send response for load_interface command
        end if
        return
```

The Applications

Applications issue commands to the UIS and receive event information from the UIS. Each application can be run in either a compiled or an interpretive environment. Compilation is a process that translates a computer program, a set of abstract instructions, into a series of machine instructions that can be executed by the computer. Software development environments that require an application to be compiled before it can be run are referred to as compiled environments. In contrast, some environments allow the user to run an abstract series of instructions directly, providing an interpreter to translate the abstract instructions into machine language as the program is being executed. Such environments are referred to as interpretive.

Applications may have one or more user interfaces in which they communicate to the user. An application with several user interfaces can load all its user interfaces when the application is initially invoked or it may load the interfaces as required by the user's selections. Each application controls the display and appearance of their user interfaces by issuing commands to the UIS. The set of commands available to the application is referred as the UIS Interface. The UIS Interface contains the code for invoking the UIS to carry out the commands. The sequence by which the UIS interface commands are issued by the application and the specification data associated with each command determine how the user interfaces will appear on the screen and determine which application functions will respond to user generated events.

From the application developers point of view, the user interface server 48 provides a front-end to the windowing system; it loads the user interface at runtime, controls the display of the user interface (sending commands to the windowing system which actually renders the user interface on the display), and provides the mechanism for interaction between the user interface and the application function.

The Display Object Store (DOS)

Figure 5:
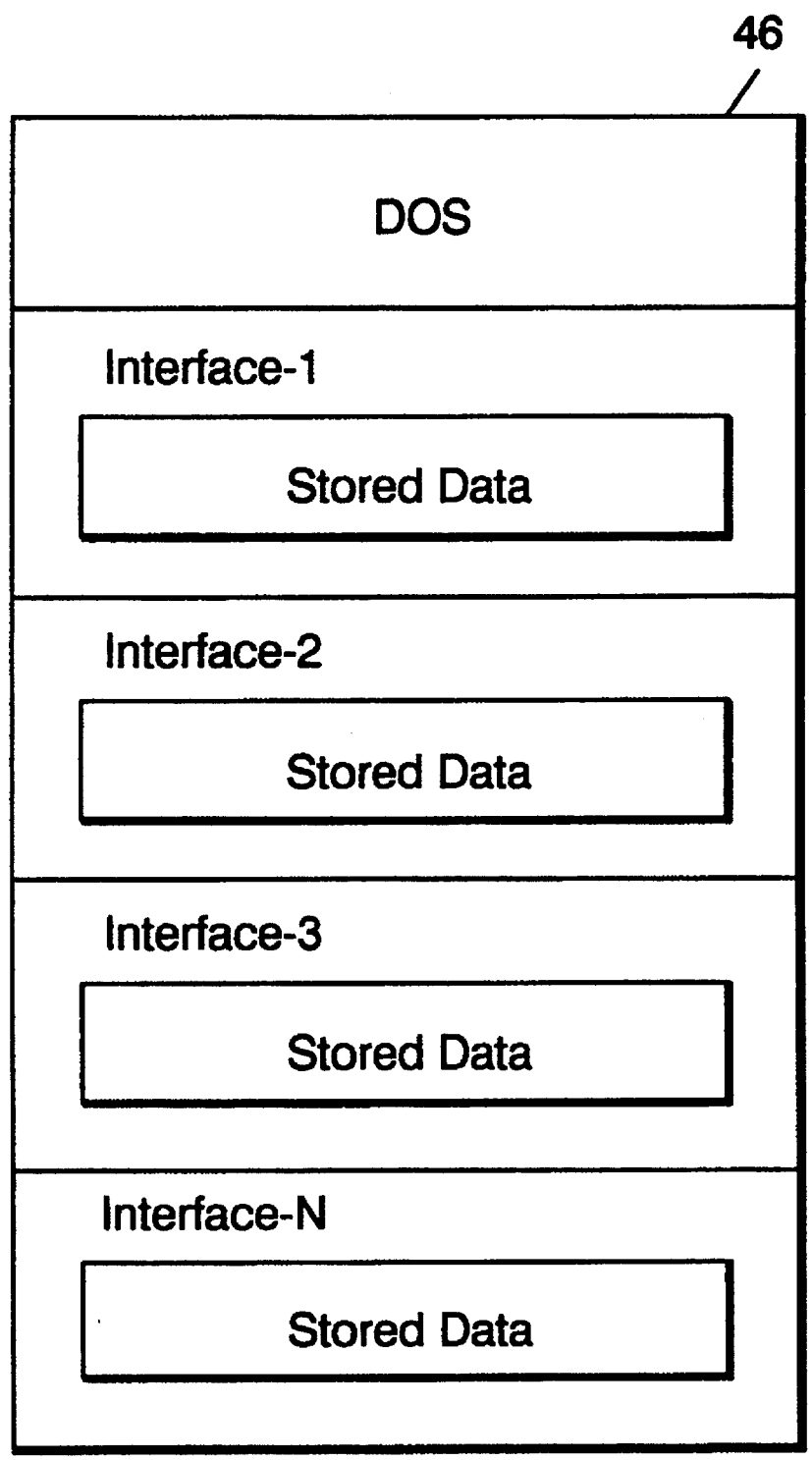
FIG. 5 shows the display object store with several interfaces.

The user interfaces are stored externally from the UIS, window management system, and the applications. FIG. 5 depicts the display object store containing several user interfaces. The user interfaces may be stored in a file or a database. The UIS can retrieve user interfaces from the display object store or have the display object store retrieve a specified user interface or a list of user interface names. A user interface in the display object store contains general information about the user interface, information about the individual components, and defines the relationship amongst the components within the user interface.

Figure 8A:
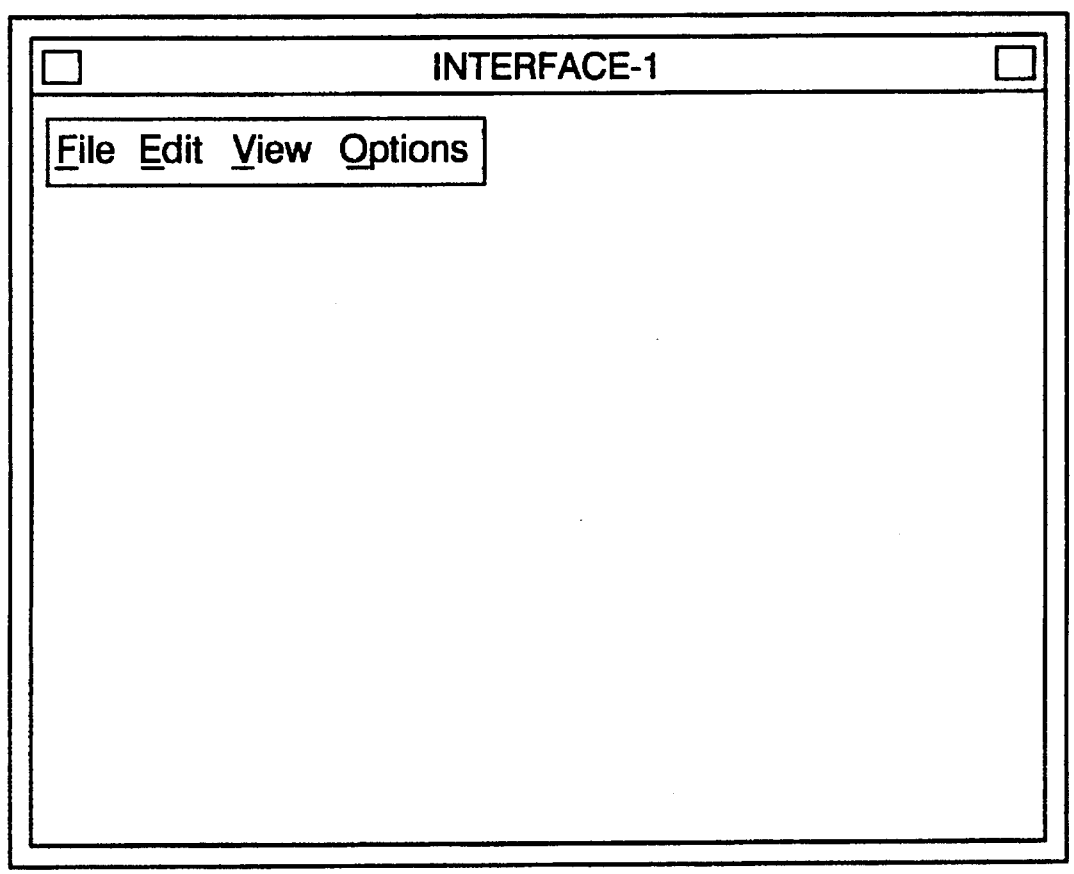
FIG. 8a shows the display of INTERFACE-1 before an attach operation.
Figure 8C:
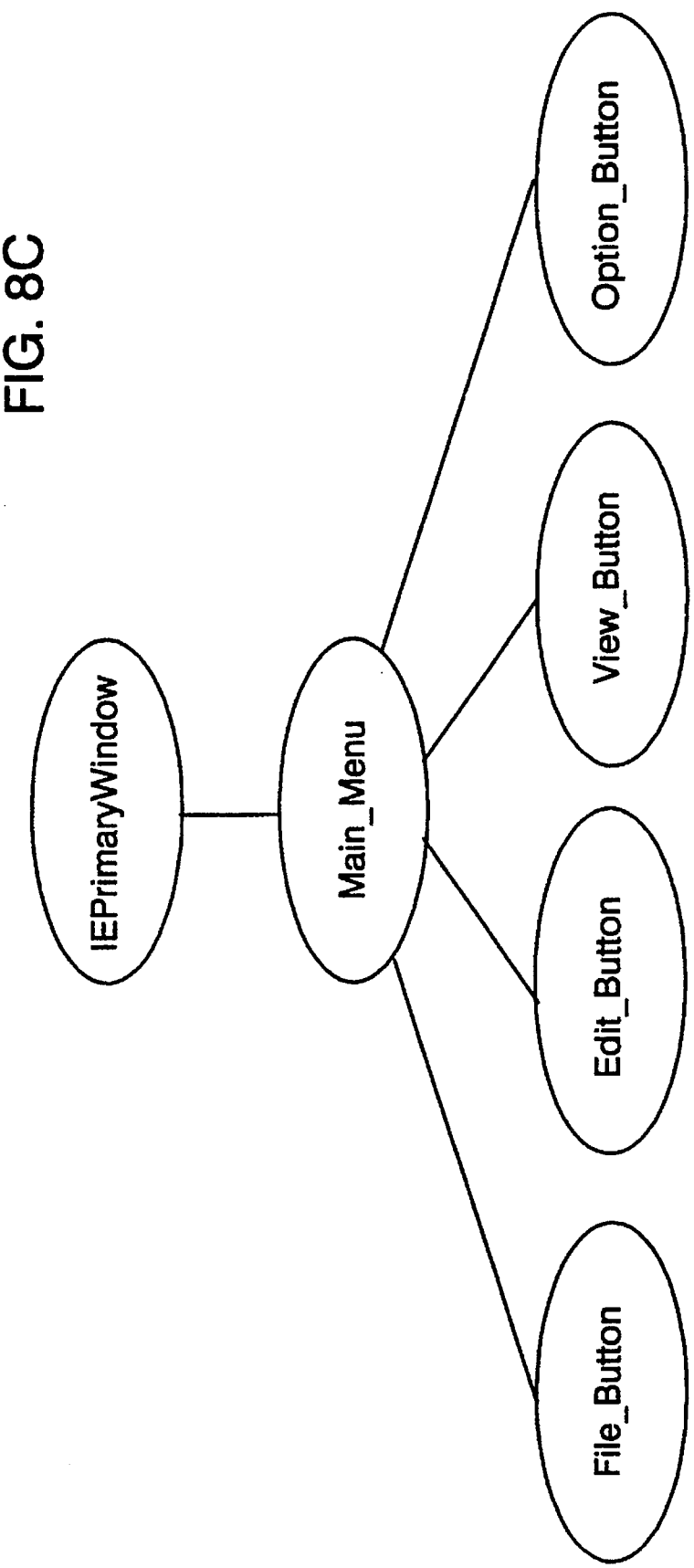
FIG. 8c shows the logical interrelationship hierarchy of components of "INTERFACE-1" in memory.

The user interfaces are stored externally from the applications and the UIS in the DOS. It is the external nature of the display object store that facilitates sharing and dynamic use of the user interfaces. The user interfaces can be stored as flat files or in a database. A flat format is a sequential or one-dimensional representation of the two-dimensional user interface hierarchy. FIG. 8b shows a user interface in flat file format. FIG. 8c shows the hierarchical representation. The displayed user interface is shown in FIG. 8a.

User interface hierarchies are easily represented in computer memory. For instance, using structures containing pointers to point from parent components to child components. However, files and some database structures do not lend themselves to such direct representation, thus the hierarchy has to be serialized into a one-dimensional representation referred to here as a flat file. Sufficient information is stored in the flat file to recreate the hierarchy later. This information is often recorded by including the name of the parent of each component with the component.

As stated previously the UIS utilizes a hierarchical organization of components in the working memory area. It is this logical hierarchical organization of the user interface components that is important. One of the advantages of representing the user interface as a hierarchy of components is inheritance. Components in the hierarchy can inherit attributes and behavior from parent components. For example, an application may have a user interface with a primary window and several secondary windows as children, with a dialog box being a child of one of the secondary windows. Under inheritance the dialog box cannot be displayed unless the parent secondary window is displayed and the secondary window cannot be displayed unless the primary window is displayed. A person of ordinary skill in the art is capable of determining the appropriate conversion from the external DOS format to the UIS internal hierarchical format. It is important to note that this invention is not limited to any particular formats for user interfaces whether in the display object store or in the working memory area. The exact format for storing the user interfaces is not significant as long as the UIS can access the user interfaces as a hierarchy in memory. Of primary importance in selecting a storage format is the ability to move the display object store from system to system with the applications.

Although the display object store 46 is shown in FIG. 2 as located in RAM 38, the display object store 46 may be stored on disk, flash memory and/or ROM without loss of functionality. The display object store 46 may also be located on an entirely different data processing system with access to the display object store provided by the communications adaptor 36, I/O 30 or the system bus 22. In fact the display object store 46 may be located on a file server so that numerous applications operating on different systems could utilize the user interfaces as stored in the display object store on the file server.

The display object store may be populated with user interfaces in a variety of ways depending on the display object store storage format selected. The user interface shown in FIG. 8b could have been created by the application developer by using a standard text editor. However, creating users interfaces by editing files in this fashion is a slow tedious process that is prone to error. A much more flexible approach is to provide the application designer with an interactive interface editing tool that provides a "what you see is what you get" ("WYSIWYG") interface. The interactive interface editing tool allows the developer to interactively create user interfaces. Thus, the developer can create interfaces by designing them on a display. The interactive interface editing tool permits retrieval and viewing of previously stored interfaces. This enables the developer to locate portions of other user interfaces that could be used in the user interface under design. The interactive interface editing tool could also be used to maintain the display object store so that additions, deletions and modifications of user interfaces would be permitted.

The Window Management System (WMS)

A window management system provides many of the important features of modern user computer interfaces. A window management system allows multiple applications to interact with the user on a single computer display, and provides low level functions for the application to display data and collect input from the user. The window management system permits applications to show results in different areas of the display, to resize the screen areas in which those applications are executing, to pop-up and to pull-down menus. The window management system is a resource manager in much the same way that an operating system is a resource manager, only the types of resources differ. The window management system allocates the resources of screen area to various applications that seek to use the screen and then assists in managing these screen areas so that the applications do not interfere with one another. The window management system also allocates the resources of interaction devices to applications that require user input and then routes the flow of input information from the devices to the event queue of the appropriate application for which the input is destined.

A window management system typically has two important parts, the first is the window manager with which the end user interacts to have windows created, resized, moved, opened, closed and so on. The second is the underlying functional component, the window system, which actually causes windows to be created, resized, moved, opened, closed and so on. The window manager can be built on top of the window system. The window manager uses services provided by the window system. The window manager is to its underlying window system as a command line interpreter is to the underlying operating system kernel. Applications are built on top of the window management system. The applications built on the window management system are sometimes called clients, which in turn use the capabilities of the window management system, itself, sometimes called the server program. In some client/server window management systems, such as the X Window system, the window manager itself appears to the window system as just another client program. In other systems there is a closer relationship between the window manager and the window system than there is between a client and server. Note that multiple clients are supported by a single server, versus linked code which requires a one to one relationship. The client/server model permits clients and servers to execute on different platforms, communicating via interprocess communications or other interconnecting means. The use of interprocess communications allows computation intensive applications to reside on a powerful computer while the user interacts with the application from a workstation. In this regard, the client/server model is just a sophisticated instance of a virtual terminal protocol; such protocols, in general, share this advantage.

A window management system does not need to be built on the client/server model. For instance, the MacIntosh™ has no well defined separation between the window manager and the window system. Such separation was not necessary for the single active process, single processor design of the MacIntosh™, and would have led to additional runtime overhead. Of course, in window management systems that provide for the use of interprocess communications between the window manager and the window systems, such as X Windows, News and Andrew, the interface must be designed to minimize communication delays.

Applications sharing a common window system can utilize a common interactive technique toolkit built for the WMS to assure a common look and feel. An interactive technique toolkit consists of a set of subroutines that provide different types of display objects. Interactive technique toolkits, which are subroutine libraries of interaction techniques, are mechanisms for making a collection of techniques available for use by applications. By using interactive technique toolkits, a consistent look and feel among applications sharing a common WMS can be insured. For instance, the menu style used to select window operations should be the same style used within all applications. Basic elements of the toolkit can include menus, dialog boxes, scroll bars, file selection boxes and the like, all which can conveniently be implemented in windows. Interactive technique toolkits are available for specific WMSs. Widely used toolkits include the Andrew Window Management Systems Toolkit, the Macintosh™ Toolkit, OSF/Motif and Inter-Views toolkits for use with the X Windows system. Also XRAY and CLUE. Several toolkits implement Open/Look on both X Windows and News, Presentation Manager™ and the Sun View Window Management Systems Toolkit.

Preferred Embodiment

A functional overview of one embodiment of the invention is shown in FIG. 4. The present invention can be implemented with a variety of hardware, software, and Window Management Systems. For purposes of illustration, the invention is described with respect to an implementation using the C language, on an IBM RISC System/6000™ workstation running AIX® and AIX X-Windows with the OSF/Motif® toolkit. The principles of this invention are not limited to this particular implementation.

The preferred embodiment provides a runtime environment for applications. It uses the X windows system for the presentation and control of user interfaces and supports applications that use multiple processes to provide the application function. An application can be thought of as a serial stream of execution across multiple processes. The preferred embodiment is implemented as a user interface server, a process, which supports serialization of event handling for a single application and concurrent event handling for multiple applications. It dispatches user interface events to other processes and controls the sensitivity of the user interface to events while previous events are being handled by the application in these other processes.

The X Window System is an industry-standard system that allows programmers to develop graphical user interfaces. One of its most important features is that it supports device independence by separating the interactions with the display, keyboard and mouse from the rest of the system. There are three parts of the windowing system: the lowest level is called Xlib 69, the other two parts are the Xt Intrinsics 68 and Widgets 67.

In the X Windows system interaction techniques are called "widgets". A typical set of widgets includes a dialog box, file selection box, alert box, help box, list box, message box, radio button bank, radio buttons, choice button bank, choice buttons, toggle button bank, toggle button, fixed menu, pop-up menu, text input, scroll bar and application window. Each of these widgets is normally implemented as a window. In the X Windows system subwindows may also be used. For instance, a radio button bank is a window containing a subwindow for each radio button. Complex dialog boxes can have dozens of subwindows. An application window may have subwindows for scroll bars, resize buttons and so on. Each widget consists of one or more calls to the X server. Thus when a widget subroutine is executed it causes a sequence of calls or commands or requests to be sent to the X server or window management system. OSF/Motif is an interaction toolkit that works with X windows and is one of a number of similar widget sets available for X Windows.

As shown in FIG. 4, the UIS can interface with the X Windows server in one of three ways through the widget set 67, Xt intrinsics 68 or directly via Xlib Interface 69. Although access to the X server 60 is via the Xlib interface 69. The Xt Intrinsics 68 provide a framework which allows the application developer to combine these components to produce a complete user interface.

The architecture of the X Window System is based on the client-server model. A single process, known as the X server 60, is responsible for all input and output devices. The server creates and manages all windows on the screen, produces text and graphics, and handles input devices such as the keyboard and mouse. The server implementation is independent of any application but is hardware specific. In the typical X Windows environment the application is a client and uses the services of the X server 60 via a network connection using an asynchronous byte stream protocol. Multiple clients can connect to the same server. This is shown in FIG. 1. The X server 60 hides the details of the device-dependent implementation of the server from the clients.

As shown in FIG. 4 the user interface server 48 is another server process to the applications, which communicates with the X server 60 in a client/server relationship on behalf of its client applications 50, 53, 54. Also part of the X Window system is a window manager 66. The window manager 66 allows the user to control the size and location of windows on the screen. In X Windows, a window manager 66 is another client application. In this configuration, it is possible for the window manager 66 to get events pertaining to the resizing or moving of windows from the X server 60 independent of the notification of these events to the applications 50, 53, 54. The window manager 66 acts independently from the applications and, together with the X server 60, may cause an application's user interface to be modified without the application being involved. The user interface server 48 can be thought of as the application or as another server process which communicates with the window management system in a client/server relationship on behalf of its client applications 50, 53, 54.

In order to provide services for multiple applications executing in other processes the UIS 48 must examine each event from the X server 60 and determine whether to allow that event to be passed to an application. The UIS 48 provides additional function to deal with the cases where the window manager 66 also receives these events and causes the user interface to be changed.

FIG. 4 shows how the user interface server 48 works with the X Windows System. Note that in the preferred embodiment the Motif widget set is assumed to be the widget set 67. The user interface server 48 uses both Xlib interface 69 and Xt Intrinsics 68 functions to check all user interface events coming in from the X server 60. The events coming from the X server 60 are placed in a queue by Xt 68. Additional events generated within Xt 68 or Motif 67, may be also be in the queue and are treated just like events coming from the X server 60. The user interface server 48 examines each of these events and determines whether to pass them on to Xt 68, to queue them, or to discard them. Some of these events will be passed by Xt 68 to Motif 67 and will cause callback functions in the user interface server 48 to be executed. Other events will cause Xlib 69 to execute event handlers in the user interface server 48. These callbacks and event handlers retrieve relevant data from the user interface components and send the data to the application.

The application sends commands to the user interface server to load, modify or query a user interface. The application can also load one user interface on top of the current user interface. The initial user interface is placed on a stack and is inactive until the new user interface is unloaded. The user interface server calls the necessary functions in Xlib 69, Xt 68 and Motif 67 to satisfy these commands. If changes to the user interface are required by these commands the user interface server 48 calls the appropriate Xlib 69, Xt 68 or Motif 67 function. Motif functions change the user interface by either calling Xlib functions 69 directly or by calling Xt functions 68 which call Xlib functions 69. Only the Xlib functions 69 communicate with the X server 60.

The window manager 66 receives window resizing and movement events from the X server 60 for windows in user interfaces that the user interface server 48 is managing. The window manager 66 causes the windows to be resized or moved as a result of these events independent of what the user interface server 48 would like to do with these events. This independent action necessitates the user interface server 48 treating the resize events differently than other events. When an application is executing an application function, the application's user interface is marked as being in a wait state and no events will be passed to Xt 68 which might result in a command being sent to the application. In order to maintain consistency between the user interface as displayed and the application's view of the user interface, which it infers from the callbacks, the resize events must be queued and sent to the application when it returns control to the user interface server 48 from the application function that it is currently executing. This queuing of callbacks only happens when the user interface specifies that resize callbacks be sent to the application, otherwise they are discarded by the user interface server 48.

The connection 56 between the X server 60 and the user interface server 48 in FIG. 4 represents multiple connections, one for each user interface displayed. Each user interface uses a separate application context as defined by Xt 68. This is the mechanism used to match events to an application and commands to the X server with a specific user interface. The connections 56 from the application clients 50, 53, 54 to the user interface server 48 can be either connection-oriented, with each application having its own connection, or it could be connection-less with each application sending and receiving to the same point (e.g., a Unix datagram socket).

The psuedocode in Table II is for the event processing loop for the UIS 48. It replaces the XtAppMainLoop because special processing is required at the event level. This special processing is necessary because user interfaces may be placed ill a wait state while the application is processing some event in another process. Managing these events when the application is distributed across multiple processes is complex and requires screening of events coming from the X server, events generated by Motif, and callbacks generated by Motif. It is necessary to inspect events and determine which events can be processed while a user interface is in a wait state and which must be thrown away. In the case of resize events that occur while the user interface is in a wait state, the event must be queued. Events that would result in a callback to the application are in general discarded if the user interface is in a wait state.

Each user interface has its own connection to the X server 60 and an associated Xt application context so that when input from the X server is detected the connection on which the event occurred is determined (line 903). There maybe multiple events so a loop is entered which will process events until there are no more events for that connection (line 904). A call to XtAppPending (line 905) determines if events are pending and returns the event type. If the interface is not in a wait state then the event is processed by calling XtAppProcessEvent (line 907). This is the same as for a typical Xt application.

There is a possibility that the event is a timer event that the Xt generates at the request of the user interface server or Xt or Motif. If this timer event is in the queue while the interface is in a wait state then it should be ignored. This is done by line 909 which determines if the event is an X event and continues processing it if it is.

At this point the interface is in a wait state and the event is an X event. The event is processed according to what type of event it is. It is possible to look at the event without removing it from the queue by calling XPeekEvent. If the event is an Expose event or a MapNotify event then it is tested further to determine if it is a window resize event. If it is a window resize event the event must be queued because the window manager has already resized the window. Otherwise Expose and MapNotify events are processed by calling XtAppProcessEvent. There are several other special cases that must be checked before discarding events. If the interface is in a wait state because a slider callback has been sent to the application then mouse button release events must be processed. Additionally all key release events are processed for the case when a callback is generated by a key press event the corresponding key release event will not be lost. The only events which are left at this point are events which might cause callbacks to be executed. These events are thrown away because they might cause callbacks to get executed.

There are events generated internally by Motif which are placed on the event queue but which are not received from the X Server. Because these events do not come from the X Server, the normal method used by the user interface server (waiting for events on connections to the X server) will not provide notification of these events. Therefore, it is necessary to use another mechanism to provided for notification that an event occurred. The XtAddtimeOut function is used to generate an event every 250 msec. When a timeout occurs it executes a routine which calls the event processing loop and then resets the timer. This allows the event processing loop to process any internally generated events.

This implementation provides for a user interface server in the Xlib/Xt/Motif environment having the following properties: 1) Maintains serialization of events for applications executing across multiple processes and 2) Supports concurrent execution of multiple applications, each having a user interface.

The user interface server provides concurrent support for multiple applications, each having its own user interface. Applications which use this user interface server to manage their own user interface do not have any X Windows or Motif dependencies in the application. This facilitates porting the applications to other window management systems. Only the user interface server needs to be adapted to the new window system environment.

TABLE II

X SERVER EVENT PROCESSING

```
901   Process_Event
902
903   get connection of event
904   do forever
905       if events are pending for application context
906           if interface not in a wait state
907               process event by calling XtAppProcessEvent
908           else
909               if event type is an X event
910                   check event using XPeekEvent
911                   /* allow passive modifications to interface */
912                   if event type is Expose or MapNotify
913                       if event is a window resize event
914                           if no resize event for this window in queue
915                               put resize event in queue for this interface
916                           end if
917                       else
918                           process event
919                       endif
920
921                   /* else check for button release to stop slider */
922                   else if button release event
923                       process event
924                   /* else check for key release event for accelerators*/
925                   else if key release event
926                       process event
927                   /* throw event away */
928                   else
929                       get next event
930                   end else
931               else
932                   /* Event not X event so jump out of loop */
933                   break out of event processing loop
934               end else
935           end else
936       end if
937   end do
938
```

Note that the Widget set 67, Xt Intrinsics 68, Xlib Interface 69, and X server 60 are X server dependent. Thus, if a WMS other than AIX X-Windows was to be used then these components, the Window System interface, and the UIS use of them would need to be replaced by components appropriate to the different WMS. The applications themselves could be simply re-compiled to run under the new platform and would not require any code changes in order to get their user interfaces running. In fact interpreted applications could be simply run in the new environment provided that the interpreter itself had been ported. Any user interface portability considerations are addressed when porting the UIS. Since the ported UIS will provide the name functionality to the applications via the UIS interface, the window management system dependencies are isolated from the applications. This provides an application developer with the ability to write window management system independent code while maintaining a common look and feel.

How the Invention is Used—Example of Operation

Figure 7A:
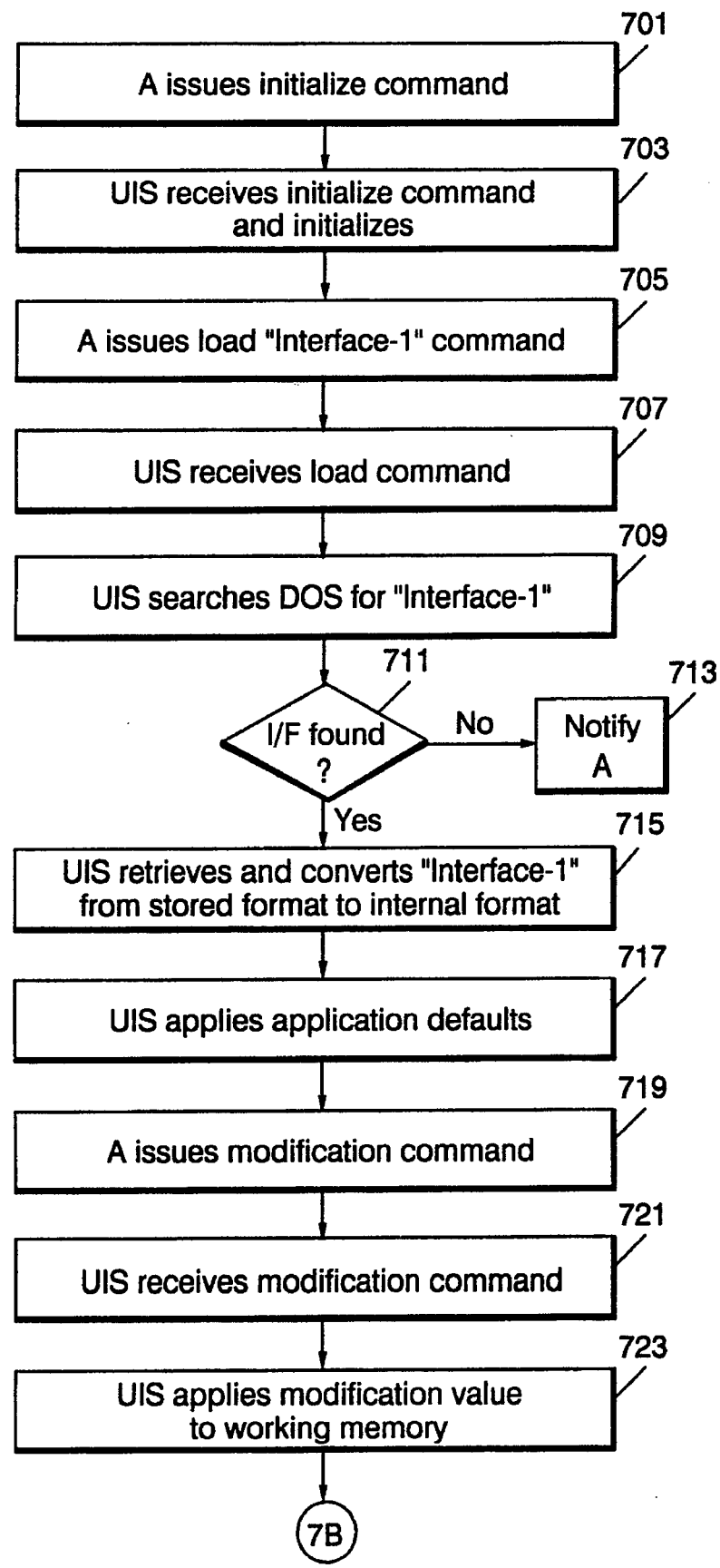
FIG. 7a shows a portion of the steps performed by application A and the user interface server to load an interface and modify its components.
Figure 7B:
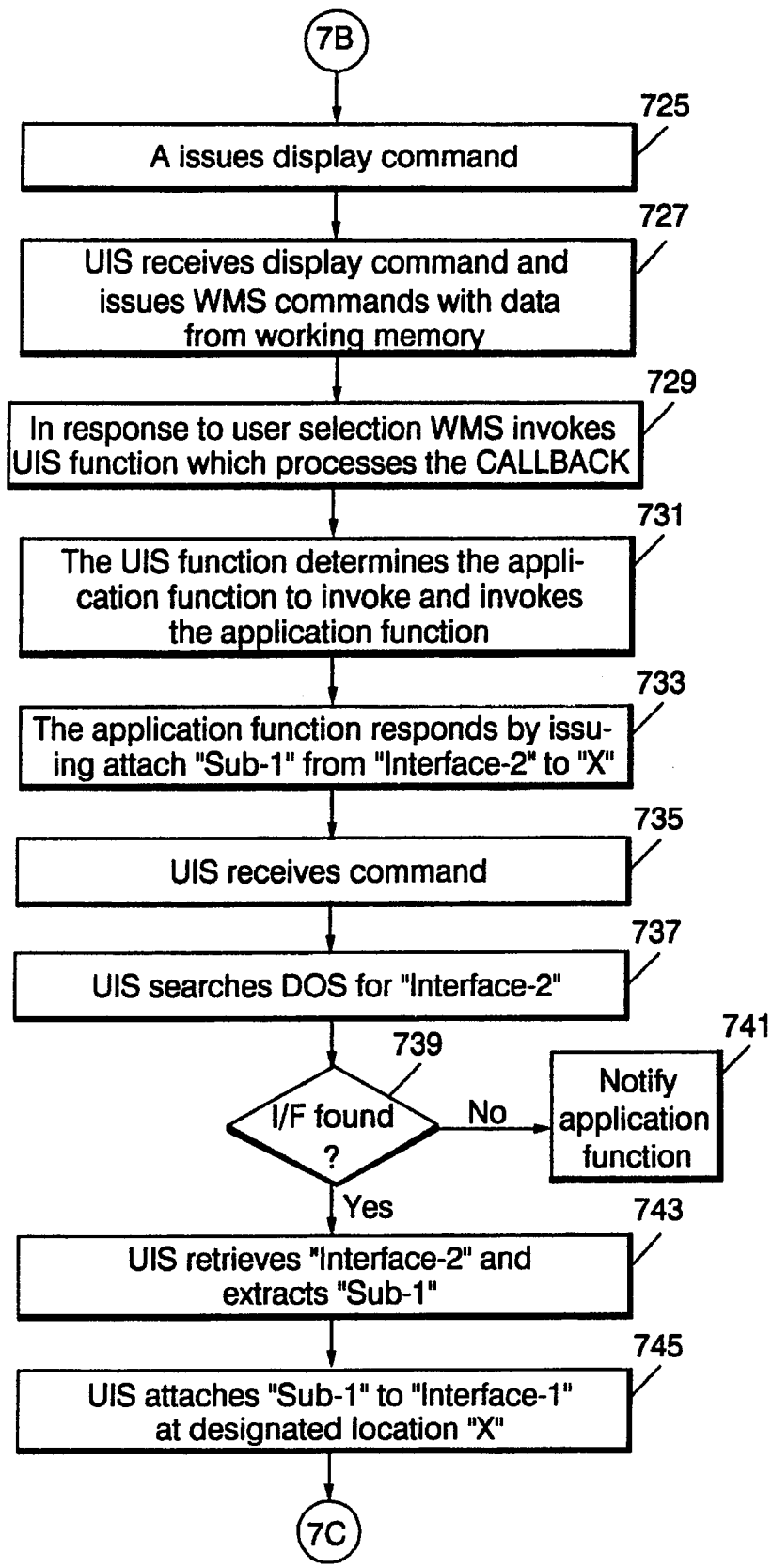
FIG. 7b shows a portion of the steps performed by application A and the user interface server to dynamically attach a sub-hierarchy.

FIGS. 7a, 7b, 7c, 8a, 8b, 8c, 9a, 9b, 9c, and 10 will now be used to demonstrate various features of the invention. FIG. 7a, 7b shows a method by which an application can load and display a first interface and responds to user input by displaying a sub-interface or subhierarchy extracted from a second interface.

In step 701, application A issues an initialize command. The initialize command allows the application to set up parameters for the exchange of information with the user interface server. The initialize command is sent to the UIS with various command parameter data required to initialize the user interface sessions between application A and the UIS. The initialize command itself may be utilized multiple times by the application to establish multiple user interface sessions. In this example, however, a single user interface session will be utilized to demonstrate the invention. The initialize command can also specify certain default parameters concerning user interface components. For example, background and foreground colors could be specified. Those of ordinary skill in the art would be able to modify the initialize command so that a single command, with appropriate parameters, would initialize multiple user interface sessions.

In step 703, the UIS receives the initialize command and initializes appropriate UIS parameters such as working memory areas and other internal variables. Step 701 may include establishing a connection with the WMS to enable communication between the UIS and the WMS for this particular user interface session. Thus the UIS may send an initialize command to the WMS to establish appropriate window management session for each user interface desired by the application. As stated previously, included with the initialize command sent from the application may be default values for resources common to all components or sets of components such as background, foreground, color, text, font, etc.

In step 705, application A issues a load INTERFACE-1 command. In step 707 the UIS receives the load command and in step 709, the UIS searches the display object store or asks the display object store to retrieve INTERFACE-1 from the display object store. FIG. 8b shows INTERFACE-1 stored as a flat file.

In step 711 of FIG. 7a, the UIS checks to see if INTERFACE-1 has been found. If the named interface has not been found, then in step 713 the UIS notifies application A that it has been unable to find INTERFACE-1. If INTERFACE-1 is located in the display object store, in step 715 the UIS (or possibly the display object store itself, as discussed earlier) retrieves INTERFACE-1 from the display object store, The UIS converts the user interface from its stored format to the internal format used by the UIS and stores the converted INTERFACE-1 in working memory area. This step may not require conversion of the interface if the interface is stored in the display object store in a hierarchical format. That is, that the display object store stores the interfaces in the same format as utilized by the UIS. This could be the case when a hierarchical data base is utilized for the display object store. Note that where a hierarchical data base is utilized, the UIS would request retrieval of the named interface from the display object store. FIG. 8c shows the logical organization of INTERFACE-1 in memory, showing the hierarchical organization of INTERFACE-1's user interface components.

Step 717 of FIG. 7a demonstrates another feature of the invention. During or after loading INTERFACE-1 into the working memory area, the UIS can apply application defaults. Application defaults can be loaded by the application with the initialize command or at any time with a modify command. These default values are applied to the user interface components of a user interface that are subsequently loaded by the UIS. For example, a foreground color may be selected by the user or by the application at initialization. This foreground color is then applied by the UIS to each user interface component of a user interface or user interface portion during loading.

Step 719 of FIG. 7a demonstrates another feature of the invention that allows an application to modify particular resources of components in a loaded user interface with modification commands. For example, a component that consists of a push button may be modified so that one or more of its resources is modified with a modification command. Such a command might change the color or the text or the font resource or all or any subset of the resources. For instance, the text resource of a push button component could be changed from "Options" to "Defaults". The modification command can also modify callback resources. The application can utilize the modification command to provide the name of the application function that is to be invoked when a callback occurs. In step 719 application A issues a modification command. In step 721 the UIS receives the command and in step 723 applies the modification by modifying the resource value in the working memory area.

The use of modification commands by the Applications promotes increased sharing of user interfaces and portions of user interfaces because each application can share the interface and tailor that shared interface with modification commands after the user interface has been loaded. In this way the applications share the user interface as stored in the display object store, but when each application causes a respective copy of the interface to be loaded in separate portions of the working memory area, they each may separately modify their respective loaded user interfaces. Thus the appearance on the screen of a user interface shared by more than one application may differ because each application can separately modify their individual loaded user interface.

In step 725 in FIG. 7b, the application issues a display command, to display INTERFACE-1 loaded in FIG. 7a. In general, when an application requests a user interface to be displayed, all displayable components of a particular interface are enabled for display. The UIS receives the display command in step 727. In response to the received display command, the UIS retrieves appropriate data from the working memory area, that was previously loaded and possibly modified in response to prior commands from application A, and formulates WMS system commands. The UIS then issues appropriate WMS commands. The WMS commands will cause INTERFACE-1 to be rendered on the display. It should be noted that formulating and issuing of the WMS commands could be done when the user interface or user interface portion is loaded into the working memory area. The resulting interface is shown as it would appear on a display in FIG. 8a.

If the user selects a displayed user interface component, such as a push button, with a mouse or keyboard or other input device an event will be generated which the WMS will process and callback the UIS with appropriate data. This is shown in step 729 (i.e, were the user has selected the "File" button on the menu bar). The callback to the UIS from the WMS invokes or causes the invocation of a UIS function that is associated with the user selected component. The UIS function name and data pointer were previously registered with the WMS by the UIS. This occurred in step 727 in this example when the WMS commands were formulated and issued. In step 731, the UIS function processes the callback and determines which application has control of the user interface associated with the event and the associated user interface component. This UIS function determines the application, the user interface component, the name of the application function to invoke and assembles parameters values for a callback to the application. The UIS function can then invoke the application function with appropriate callback data. Application A had previously setup a callback via a callback resource associated with the user selected component i.e., the particular push button selected by the user. It is the callback resource associated with the selected push button that provides the UIS with the name of the specific application function to invoke. In this example the component is the "file_button" that has an activate_button_callback resource specifying the "do_file_pulldown" function of application A is to invoked when the "file_button" is selected. The "file_button" component and its associated resources are listed in FIG. 8b.

In step 733 of FIG. 7b, "do_file_pulldown" function of application A, associated with the "file_button" selected by the user, issues an attach SUB-1 sub-hierarchy from INTERFACE-2 to X component of INTERFACE-1. This command instructs the UIS to obtain the SUB-1 sub-hierarchy from INTERFACE-2 and attach it to X component in INTERFACE-1. In this example SUB-1 is the "file_pulldown" component and its children (i.e., "new_button", "open_button", "saveas_button", "print_button", "quit_button"). The X component for this example is the "file_button" component of INTERFACE-1.

In step 735, the UIS receives the command. In step 737, the UIS looks for INTERFACE-2 in the display object store. As stated previously, the UIS may issue a retrieve command to the display object store or it may actually look for the named interface itself in the display object store. If for some reason INTERFACE-2 is not found in the display object store, then in steps 739 and 741, the UIS will notify the application function of application A responsible for handling the callback that it has not found INTERFACE-2 and that the attached command cannot be completed, If however, the UIS is able to locate INTERFACE-2, the UIS will retrieve INTERFACE-2 and extract the SUB-1 sub-hierarchy. This is done in step 743. INTERFACE-2 with the SUB-1 sub-hierarchy is shown in flat file format in FIG. 9b. After extracting the SUB-1 sub-hierarchy, the UIS attaches the SUB-1 hierarchy to INTERFACE-1 at the designated location X in step 745.

Figure 9A:
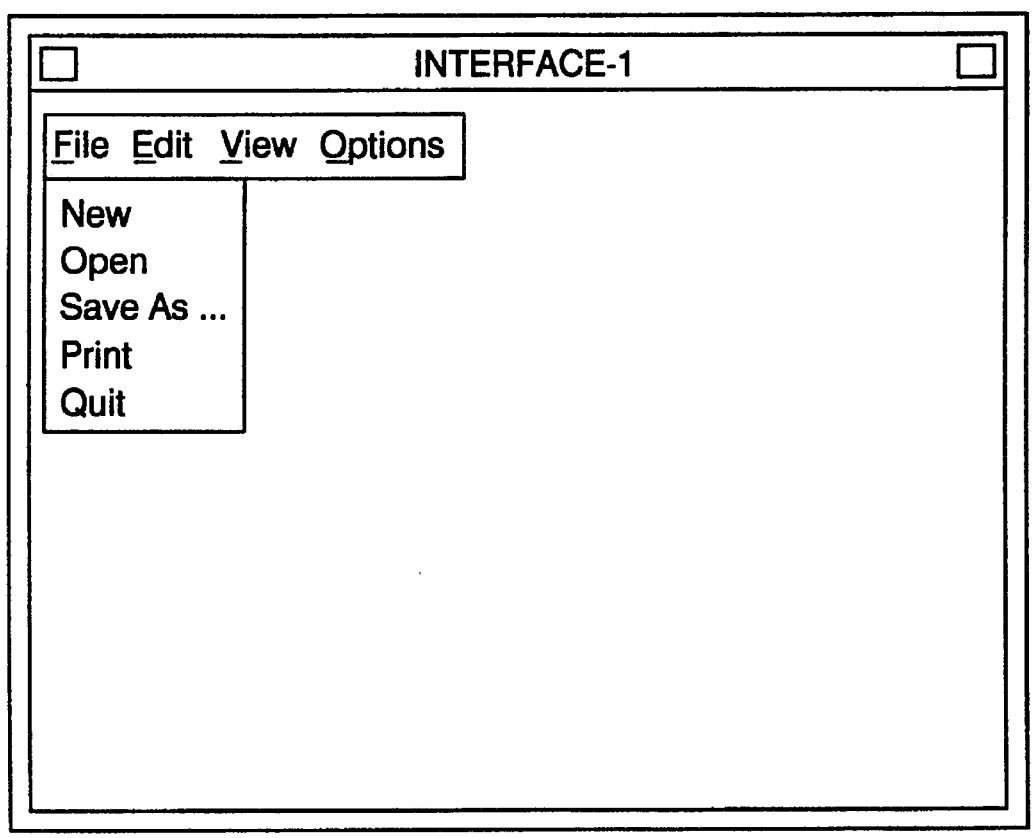
FIG. 9a shows the display after an attach operation.
Figure 9C:
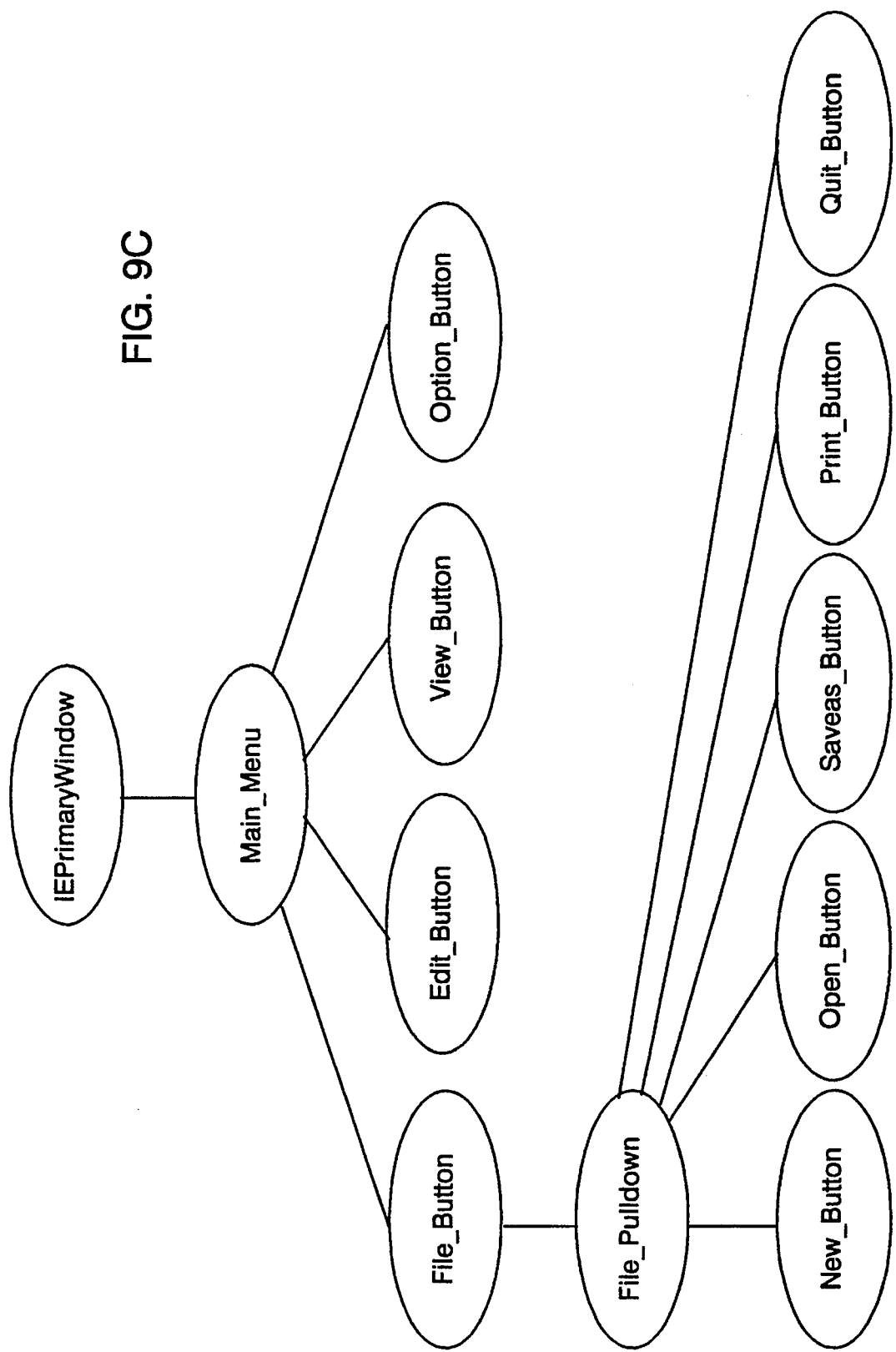
FIG. 9c shows the logical interrelationship of components of "INTERFACE-1" with the sub-hierarchy attached.

FIG. 9c shows the hierarchical organization of INTERFACE-1 with SUB-1 sub-hierarchy attached. In step 747 the application function of application A responsible for handling the callback issues a display command to the UIS. In step 749, the UIS receives the command, formulates in WMS commands and issues the WMS commands, along with appropriate data from the working memory area to the WMS. The resulting interface is shown as it would appear on a display in FIG. 9a.

Figure 7C:
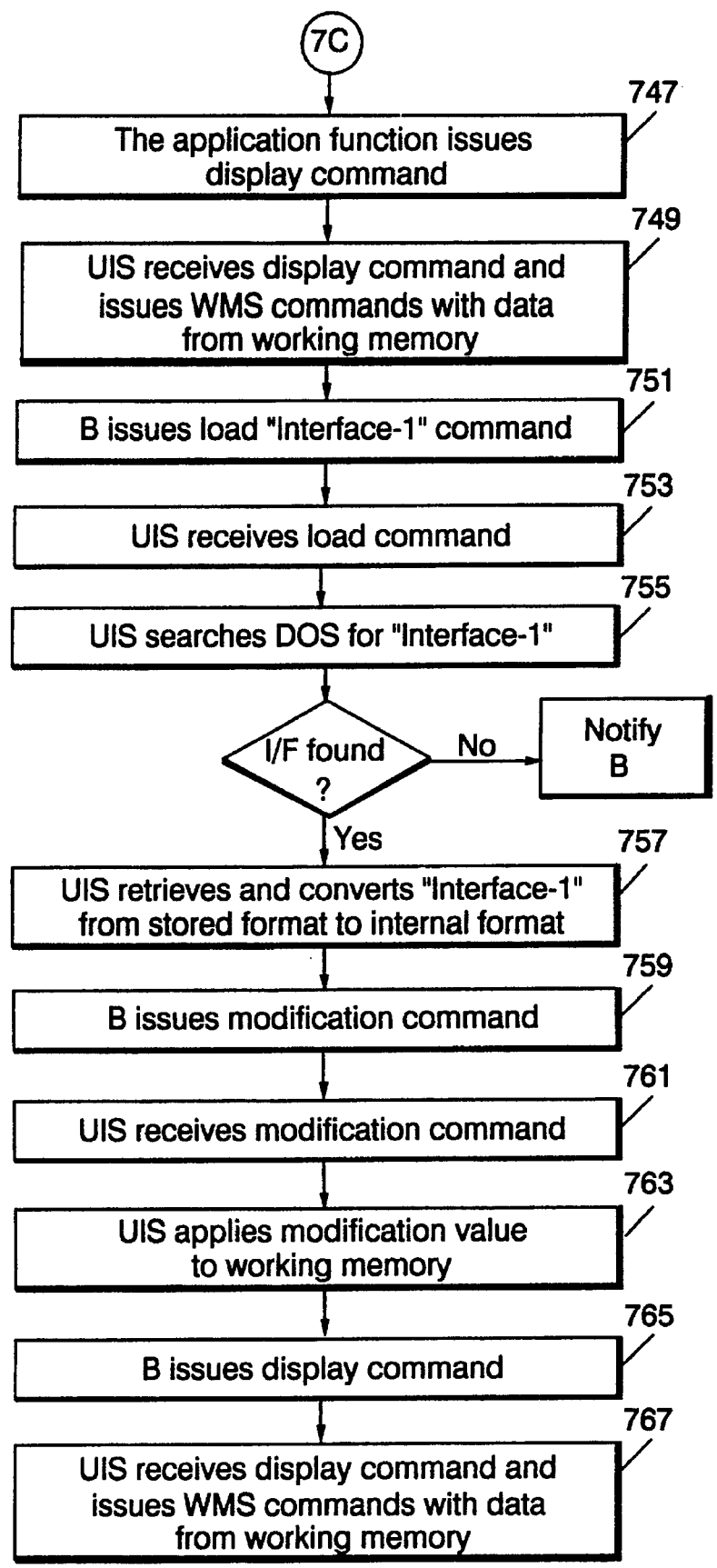
FIG. 7c shows the steps performed by application B to dynamically load "INTERFACE-1".

Continuing now to FIG. 7c, sharing of a user interface will now be demonstrated. In step 751, application B issues a load INTERFACE-1 command. In step 753 the UIS receives the load command and in step 755, the UIS searches the display object store or asks the display object store to retrieve INTERFACE-1. FIG. 8b shows INTERFACE-1 stored as a flat file.

In step 757 the UIS retrieves INTERFACE-1 from the display object store and converts it from its stored format to the internal format used by the UIS and stores the converted INTERFACE-1 in the working memory area. FIG. 8c shows the logical organization of INTERFACE-1 showing the hierarchical organization of INTERFACE-1's display components. Note that Application A and Application B each have distinct copies of INTERFACE-1 load in the working memory area.

Step 759 of FIG. 7c demonstrates the feature of the invention that allows an application to modify particular resources of components in a loaded user interface with one or more modification commands. In step 759 Application B issues a modification command to change the title of the "IEPrimaryWIndow" component. Thus, in this example the "IEPrimaryWindow" component was modified to change the title from "INTERFACE-1" to "Application B". In step 761 the UIS receives the command and in step 763 applies the modification by modifying the resource value in the working memory area.

In step 765, the application B issues a display command. The UIS receives the display command in step 767. In response to the received display command, the UIS retrieves appropriate data from the working memory area that was previously loaded and possibly modified in response to prior commands from application B. The UIS then issues appropriate WMS commands formulated from the data contained in the working memory area to render Application B's version of INTERFACE-1. The resulting interface is shown along with Application A's interface in FIG. 10 as it would appear on a display.

Note that Application A and Application B share the same stored interface (i.e., INTERFACE-1) but a separate copy of the interface is loaded for each application. This permits each application to separately modify the interfaces to suit the application's particular needs. Other Applications could also use INTERFACE-1. The example also demonstrates the sharing of portions of user interfaces, in that SUB-1 sub-hierarchy of INTERFACE-2 was utilized by application A. Although not shown in FIG. 7, other applications could request that INTERFACE-2 be loaded and displayed. Although FIG. 7 depicts Application A loading and displaying its user interface followed by Application B loading and displaying its user interface, the invention is not limited to this ordering of commands. The commands from Application B could precede or be interlaced with the commands from Application A.

It is important to note that not all steps shown in FIG. 7 are required for the invention. However, the additional steps illustrate some of the features of the invention.

Psuedocode for an Example of Operation

The pseudocode in Table III represents the general operation by which an application can load a portion of a user interface and attach it to a previously loaded user interface. At line 201, the application issues a load command which specifies that the main interface is to be loaded. The main interface is the interface to which the sub-hierarchy will be attached. At line 202, the application attaches a sub-hierarchy to the main interface, specifying the interface containing the sub-hierarchy, the head component of the sub-hierarchy, and the component in the main interface to which the sub-hierarchy is to be attached. At line 203 the application then issues a display command specifying that the main interface with its newly attached components is to be displayed.

The pseudocode in Table IV shows the same operation, but from the user interface server perspective. At line 301, the main user interface is retrieved from the display object store loaded in accordance with the application command issued at line 201. At line 302 the UIS converts the main user interface from display object store stored format to the UIS internal hierarchical format. At line 303, the UIS retrieves the interface containing the sub-hierarchy from the display object store and loads it leaving it in its display object store format instead of converting to the UIS internal hierarchical structure. The sub-hierarchy is then extracted from the user interface at line 304. Many different methods may be used to implement line 304 which extracts the sub-hierarchy from the user interface. All involve locating the specified head component of the sub-hierarchy, and all the components that belong directly or indirectly to it. At line 305 the head component of the sub-hierarchy is attached to the main interface at the point specified by the application at line 202. If the head component of the sub-hierarchy is not a valid child of the specified parent in the main user interface, an error results. Lines 306–308 are a loop, repeated for each component in the sub-hierarchy. During each repetition of the loop a component from the sub-hierarchy is added to the main interface, maintaining its relative position in the sub-hierarchy. Line 309 frees the temporary storage used when the sub-hierarchy was loaded from the display object store. Finally, at line 310 the UIS issues the WMS commands necessary to cause the main interface to be displayed.

TABLE III

/* load interface that the sub-hierarchy will attach to */
201 load main interface /* attach the sub-hierarchy */
202 load interface containing sub-hierarchy, specify head component of sub-hierarchy, specify component in main interface that sub-hierarchy is to be attached to /* display combined runtime interface (main plus sub-hierarchy)*/
203 display main interface

TABLE IV

```
/* load interface that the sub-hierarchy will attach to */
301  load main interface
302  convert main interface from flat format to internal
     hierarchical structure /* attach the sub-hierarchy */
303  load interface containing sub-hierarchy into temporary storage
304  extract identified sub-hierarchy
305  add top-level sub-hierarchy component to internal main
     interface structure
306  for each child in sub-hierarchy
307        add component to internal main interface structure,
           maintaining relative position in sub-hierarchy
308  endfor
309  free temporary storage
/* display combined runtime interface (main plus sub-hierarchy)*/
310  display main interface
```

The main interface with its newly attached components is dynamically created at runtime as specified by the application. The User Interfaces as stored in the display object store are not modified. In summary, the attach sub-hierarchy function of the user interface server allows the application to attach a portion of a user interface to another user interface that is already loaded. This provides applications the capability of dynamically sharing portions of stored user interfaces.

Advantages of the Invention

The present invention solves the identified drawbacks of the prior art. This invention allows applications to share portions of user interfaces, avoiding replication of code and significantly reducing maintenance problems. The sharing is specified dynamically at the application level, allowing applications to specify sharing of user interfaces as needed in response to user selections within their user interfaces. Thus, applications can specify at runtime a user interface sub-hierarchy to attach to a loaded user interface. Providing dynamic sharing of user interfaces avoids replication of common components and the associated maintenance problems. Dynamic sharing also allows the application to defer attaching the shared user interface sub-hierarchy until it is needed. Thus, if the user never makes a selection that requires the sub-hierarchy, the user interface sub-hierarchy is never attached. Dynamic loading can save processing time, particularly when the user interface sub-hierarchy is large and not often used. This reduces memory utilization for an application's user interface, because only likely to be needed portions or sub-hierarchies of a user interface need to loaded into memory.

This invention avoids the disadvantages of the previously mentioned alternatives. Unlike the alternative of replicating common code, this invention has only one place where changes to common components are made, the display object store, thus easing maintenance.

Unlike the alternative of sharing components at the display level without sharing at the user interface object level, this invention has only one place where changes to common components are made, thus easing maintenance. Unlike the alternative of sharing at both the display and user interface object levels, this invention maintains separate display objects that can be controlled and modified independently of any duplicate sub-hierarchy that is displayed. The present invention shares the stored user interfaces, but maintains distinct runtime interfaces, allowing more flexibility for the application.

Unlike the alternative of hard coding links to shared sub-hierarchies in the user interface object, this invention provides truly dynamic sharing of portions of user interfaces for the application.

Unlike the alternative of creating separate user interface objects for shared sub-hierarchies, this invention avoids changes to the original user interfaces and applications as new interfaces come along that want to share. Also, ownership is not ambiguous; the ownership of the sub-hierarchy clearly belongs to the original user interface. Another advantage over the alternative is that all user interface objects are complete in the sense that they can be displayed; this is simpler to manage than having undisplayable pieces coexist with complete displayable user interface objects.

Closing

The invention provides for the sharing of user interfaces and portions of user interfaces by providing applications with the ability to dynamically load user interfaces and portions of user interfaces from a display object store. The present invention can be implemented on a variety of hardware, software, and Window Management Systems. For example, it could be implemented on a personal computer running Windows™ or Presentation Manager with OS/2 or on a Sun or HP workstation running X windows for Unix, or on an IBM RISC System/6000 workstation running AIX and AIX X-Windows.

While the present invention has been described with reference to structures disclosed herein, it is not confined to the details set forth and this disclosure is intended to cover such modifications or changes as may come within the purposes of the improvements or the scope of the following claims.

What is claimed is:

1. In a data processing system including computing means, memory means, display means, and input means interconnected by a system bus, a subsystem for the dynamic sharing of user interfaces, said subsystem comprising:

a display object store stored in the memory means, said display object store containing a plurality of user interfaces, wherein each user interface display includes a plurality of hierarchically related user interface components and each of said user interfaces being identified by a user interface identifier;

a plurality of applications stored in the memory means, each application requiring the display of a user interface;

a window management system, stored in the memory means, for rendering user interfaces on the display means;

a user interface server stored in the memory means, the user interface server comprising:
control means for executing a received command from an application;
first command interface means for receiving said received command and associated data, wherein the received command is one of a first set of commands;
second command interface means for formulating and sending one or more rendering commands to the window management system in response to a received command, wherein the rendering command is one of a second set of commands; and
third command interface means for causing the retrieval of user interfaces from the display object store in response to a received command;

wherein a first application issues a load command from the first set of commands, the load command having a user interface identifier, the user interface server receiving the load command through the first command interface means, in response to receiving the load command the control means retrieving the user interface identified by the user interface identifier from the display object store through the third interface means, the control means then loading the user interface into a working memory area;

and wherein said first application issues one or more modify commands from the first command set wherein each modify command specifies a user interface component resource identifier and a new resource value, the user interface server receiving each modify command from the first command interface means, in response to receiving the modify command the control means locates the user interface component resource in the working memory area associated with the issuing application as specified by the user interface component resource identifier, the control means then setting the value of the resource in working memory the new resource value.

2. The subsystem as claimed in claim 1 wherein after the control means retrieves a user interface from the display object store said control means converts the user interface from display object store format to a hierarchical format in working memory.

3. The subsystem as claimed in claim 2 wherein the first application issues a display command from the first command set, the display command contains a user interface identifier, the user interface server receives the display command through the first command interface means, in response to receiving the display command the control means locates the user interface specified by the user interface identifier in working memory, the user interface server then formulates one or more commands from a second set of commands and sends the formulated commands to the window management system, in response to the formulated commands the window management system causes the user interface specified by the user interface identifier to be rendered on the display means.

4. The subsystem as claimed in claim 3 wherein the first application issues an attach command from the command set wherein the attach command contains a user interface identifier, a hierarchy identifier that identifies a hierarchy, and a user interface component identifier, the user interface server receives the attach command through the first command interface means, in response to receiving the attach command the control means retrieves the user interface specified by the user interface identifier from the display object store through the third interface means, the control means then extracts the hierarchy identified by the hierarchy identifier from the user interface, the control means then converts the hierarchy and attaches the hierarchy to the user interface component in working memory identified by the user interface component identifier.

5. In a data processing system, a subsystem for the dynamic sharing of user interface displays among a plurality of applications, said subsystem comprising:

a display object store, said display object store containing a plurality of user interfaces, wherein each user interface includes a plurality of user interface components and each of said user interface being identified by a user interface display identifier;

window management means for rendering user interface on a display;

a user interface server, the user interface server comprising:
means for receiving a load command and associated data from an application, said load command including a user interface identifier;
means for formulating and sending rendering commands to the window management means in response to a received load command;
means for retrieving a user interface from the display object store in response to a received load command;
means for receiving from an application a modify command, said modify command specifying a user interface component identifier identifying a user interface component in a retrieved user interface, and said modify command specifying a new resource value for said user interface component identified by said user interface component identifier; and,
means for setting the value of the user interface component identified by said user interface component identifier to the new resource value specified by said modify command.

6. In a data processing system, a method for the dynamic sharing of user interface displays among a plurality of applications, said method comprising the computer implemented steps of:

storing in said data processing system a display object store, said display object store containing a plurality of user interface, wherein each user interface includes a plurality of user interface components and each of said user interfaces being identified by a user interface identifier;

storing, in said data processing system, window management means for rendering user interfaces on a display;

receiving a load command and associated data from an application, said load command including a user interface identifier;

formulating and sending rendering commands to the window management means in response to a received load command;

retrieving a user interface from the display object store in response to a received load command;

receiving from an application a modify command, said modify command specifying a user interface component identifier identifying a user interface component in a retrieved user interface, and said modify command specifying a new resource value for said user interface component identified by said user interface component identifier; and, setting the value of the user interface component identified by said user interface component identifier to the new resource value specified by said modify command.

* * * * *